US007650620B2

(12) United States Patent
Fish et al.

(10) Patent No.: US 7,650,620 B2
(45) Date of Patent: *Jan. 19, 2010

(54) METHOD AND APPARATUS FOR PUSH AND PULL DISTRIBUTION OF MULTIMEDIA

(76) Inventors: Laurence A Fish, 1840 Lyndon Rd., San Diego, CA (US) 92103; Lowell E Teschmacher, 1410 Cressa Ct., Carlsbad, CA (US) 92009; Anibal-Jose Rivero, 11336 Cmn Playa Cancun #2, San Diego, CA (US) 92124; Roswell R Roberts, III, 11272 Woodruch Ct., San Diego, CA (US) 92128

( * ) Notice: Subject to any disclaimer, the term of this patent is extended or adjusted under 35 U.S.C. 154(b) by 167 days.

This patent is subject to a terminal disclaimer.

(21) Appl. No.: 11/686,763

(22) Filed: Mar. 15, 2007

(65) Prior Publication Data

US 2007/0239609 A1    Oct. 11, 2007

Related U.S. Application Data

(63) Continuation of application No. 09/263,801, filed on Mar. 6, 1999, now Pat. No. 7,194,757.

(60) Provisional application No. 60/077,147, filed on Mar. 6, 1998.

(51) Int. Cl.
*H04N 7/20* (2006.01)
*H04N 7/173* (2006.01)

(52) U.S. Cl. .......................... 725/66; 725/86; 725/111; 725/113; 725/121; 709/217; 709/218; 709/219

(58) Field of Classification Search .................. 725/63, 725/67, 86, 11–114, 121; 707/174, 217; 709/217–219

See application file for complete search history.

(56) References Cited

U.S. PATENT DOCUMENTS 3,626,295 A   12/1971   Sabrui (Continued)

FOREIGN PATENT DOCUMENTS

AU    744624    10/2000

(Continued)

OTHER PUBLICATIONS

Zwicker, et al. "Psychoacoustics", Springer-Verlag, 1990 pp. 1-5.
http://web.archive.org/web/1997060511457/www.ups.gov/tracking/tracking.htm- 1, Jun. 5, 1997.

(Continued)

*Primary Examiner*—Hunter B. Lonsberry
(74) *Attorney, Agent, or Firm*—Woodcock Washburn LLP

(57) ABSTRACT

The present specification discloses a multimedia distribution system and method. The system and method has a producer workstation, a delivery server, a high-bandwidth one-way satellite transmission system, a terrestrial two-way communication system (including use of the Internet), a plurality of satellite affiliate workstations, and a plurality of terrestrial client workstations. The delivery server receives digital information (envelopes and associates media files) from the producer workstations for delivery of the information to the affiliate and client workstations addressed in the envelope. The affiliate and client workstations provide the delivery server with confirmation of delivery of each received envelope and its associated files. In the absence of receipt of confirmation of delivery, the delivery server re-sends the unconfirmed envelope and associated files to the non-confirming affiliate or client workstation by a two-way terrestrial connection or by a manual system, such as a dub-and-ship service. The delivery server has the ability to push content to affiliates, push-pull content to affiliate and clients, to conventionally pull content from the delivery server, and push the content to affiliates and clients by manual delivery services. The disclosed system and method utilize a unique envelope and addressing protocol and a unique broadcast file transfer protocol for distribution to affiliate workstations by one-way satellite broadcast. The disclosed system and method also make significant use of the TCP/IP, IGMP, and Ethernet protocols and information distribution techniques.

15 Claims, 14 Drawing Sheets

U.S. PATENT DOCUMENTS

| | | |
|---|---|---|
| 3,898,376 A | 8/1975 | Nabeyama et al. |
| 4,130,730 A | 12/1978 | Ostrowski |
| D264,691 S | 6/1982 | Volkland et al. |
| 4,346,262 A | 8/1982 | Willems et al. |
| D267,249 S | 12/1982 | Fukushima et al. |
| 4,494,238 A | 1/1985 | Groth |
| D277,569 S | 2/1985 | Georgopulos |
| 4,544,950 A | 10/1985 | Tu |
| D281,974 S | 12/1985 | Suzuki et al. |
| RE32,124 E | 4/1986 | Atal |
| 4,624,012 A | 11/1986 | Lin et al. |
| 4,641,343 A | 2/1987 | Holland et al. |
| D289,616 S | 5/1987 | Imazeki |
| D291,443 S | 8/1987 | Pedinielli et al. |
| 4,720,873 A | 1/1988 | Goodman et al. |
| 4,725,886 A | 2/1988 | Galumbeck et al. |
| 4,731,783 A | 3/1988 | Fontanes |
| 4,763,321 A | 8/1988 | Calvignac et al. |
| 4,821,260 A | 4/1989 | Klank et al. |
| 4,831,624 A | 5/1989 | McLaughlin et al. |
| 4,907,277 A | 3/1990 | Callens et al. |
| 4,916,539 A | 4/1990 | Galumbeck |
| 4,972,484 A | 11/1990 | Theile et al. |
| 5,111,292 A | 5/1992 | Kuriacose et al. |
| 5,132,992 A | 7/1992 | Yurt et al. |
| 5,144,431 A | 9/1992 | Citta et al. |
| 5,151,998 A | 9/1992 | Capps |
| 5,161,210 A | 11/1992 | Druyvesteyn et al. |
| 5,214,708 A | 5/1993 | McEachern |
| 5,239,540 A | 8/1993 | Rovira et al. |
| 5,253,275 A | 10/1993 | Yurt et al. |
| 5,282,028 A | 1/1994 | Johnson et al. |
| 5,282,202 A | 1/1994 | Bernstein et al. |
| 5,287,351 A | 2/1994 | Wall, Jr. |
| 5,301,363 A | 4/1994 | Hinderks |
| 5,305,440 A | 4/1994 | Morgan et al. |
| 5,319,707 A | 6/1994 | Wasilewski et al. |
| 5,325,423 A | 6/1994 | Lewis |
| 5,333,155 A | 7/1994 | Dambacher |
| D349,503 S | 8/1994 | Roy |
| 5,341,457 A | 8/1994 | Hall, II et al. |
| D350,544 S | 9/1994 | Sakuta et al. |
| 5,349,699 A | 9/1994 | Erben et al. |
| 5,375,068 A | 12/1994 | Palmer et al. |
| 5,381,412 A | 1/1995 | Otani |
| 5,388,182 A | 2/1995 | Benedetto et al. |
| 5,389,965 A | 2/1995 | Kuzma |
| 5,392,066 A | 2/1995 | Fisher et al. |
| 5,392,353 A | 2/1995 | Morales |
| 5,394,561 A | 2/1995 | Freeburg |
| 5,396,497 A | 3/1995 | Veltman |
| 5,403,639 A | 4/1995 | Belsan et al. |
| 5,404,567 A | 4/1995 | DePietro et al. |
| 5,406,558 A | 4/1995 | Rovira et al. |
| 5,414,773 A | 5/1995 | Handelman |
| 5,432,907 A | 7/1995 | Picazo, Jr. et al. |
| 5,440,336 A | 8/1995 | Buhro et al. |
| 5,455,570 A | 10/1995 | Cook et al. |
| 5,461,619 A | 10/1995 | Citta et al. |
| 5,463,424 A | 10/1995 | Dressler |
| 5,479,447 A | 12/1995 | Chow et al. |
| 5,490,136 A | 2/1996 | Sereno et al. |
| 5,490,233 A | 2/1996 | Kovacevic |
| 5,493,339 A | 2/1996 | Birch et al. |
| 5,493,647 A | 2/1996 | Miyasaka et al. |
| 5,495,554 A | 2/1996 | Edwards et al. |
| 5,508,949 A | 4/1996 | Konstantinides |
| 5,515,107 A | 5/1996 | Chiang et al. |
| 5,528,725 A | 6/1996 | Hui |
| 5,530,655 A | 6/1996 | Lokhoff et al. |
| 5,534,913 A | 7/1996 | Majeti et al. |
| 5,535,300 A | 7/1996 | Hall, II et al. |
| 5,550,863 A | 8/1996 | Yurt et al. |
| D373,767 S | 9/1996 | Hinderks |
| 5,557,334 A | 9/1996 | Legate |
| 5,557,724 A | 9/1996 | Sampat et al. |
| 5,559,549 A | 9/1996 | Hendricks et al. |
| 5,561,637 A | 10/1996 | Dan et al. |
| 5,566,209 A | 10/1996 | Forssen et al. |
| 5,581,653 A | 12/1996 | Todd |
| 5,583,962 A | 12/1996 | Davis et al. |
| 5,586,121 A | 12/1996 | Moura et al. |
| 5,588,024 A | 12/1996 | Takano |
| 5,590,108 A | 12/1996 | Mitsuno et al. |
| 5,594,490 A | 1/1997 | Dawson et al. |
| 5,606,668 A | 2/1997 | Shwed |
| 5,608,446 A | 3/1997 | Carr et al. |
| 5,633,981 A | 5/1997 | Davis |
| 5,659,615 A | 8/1997 | Dillon |
| 5,659,877 A | 8/1997 | Enomoto et al. |
| 5,675,575 A | 10/1997 | Wall, Jr. et al. |
| 5,694,334 A | 12/1997 | Donahue et al. |
| 5,694,490 A | 12/1997 | Howell et al. |
| 5,694,546 A | 12/1997 | Reisman |
| 5,699,411 A | 12/1997 | Becker et al. |
| 5,706,335 A | 1/1998 | Hinderks |
| 5,727,002 A | 3/1998 | Miller et al. |
| 5,732,078 A | 3/1998 | Arango |
| 5,732,216 A | 3/1998 | Logan et al. |
| 5,737,739 A | 4/1998 | Shirley et al. |
| 5,751,356 A | 5/1998 | Suzuki et al. |
| 5,778,187 A | 7/1998 | Monteiro et al. |
| 5,778,372 A | 7/1998 | Cordell et al. |
| 5,781,909 A | 7/1998 | Logan et al. |
| 5,809,145 A | 9/1998 | Slik et al. |
| 5,818,441 A | 10/1998 | Throckmorton et al. |
| 5,818,845 A | 10/1998 | Moura et al. |
| 5,828,655 A | 10/1998 | Moura et al. |
| 5,828,839 A | 10/1998 | Moncreiff |
| 5,835,726 A | 11/1998 | Shwed et al. |
| 5,838,906 A | 11/1998 | Doyle et al. |
| 5,841,979 A | 11/1998 | Schulhof et al. |
| 5,848,386 A | 12/1998 | Motoyama |
| 5,852,721 A | 12/1998 | Dillon et al. |
| 5,862,325 A | 1/1999 | Reed et al. |
| 5,881,131 A | 3/1999 | Farris et al. |
| 5,893,091 A | 4/1999 | Hunt et al. |
| 5,894,554 A | 4/1999 | Lowery et al. |
| 5,987,480 A | 11/1999 | Donohue et al. |
| 5,991,292 A | 11/1999 | Focsaneanu et al. |
| 5,991,306 A | 11/1999 | Burns et al. |
| 5,991,596 A | 11/1999 | Cunningham et al. |
| 5,995,726 A | 11/1999 | Dillon |
| 6,002,720 A | 12/1999 | Yurt et al. |
| 6,006,173 A | 12/1999 | Wiese et al. |
| 6,011,548 A | 1/2000 | Thacker |
| 6,018,764 A | 1/2000 | Field et al. |
| 6,021,307 A | 2/2000 | Chan |
| 6,023,345 A | 2/2000 | Bloomfield |
| 6,034,689 A | 3/2000 | White et al. |
| 6,038,594 A | 3/2000 | Puente et al. |
| 6,041,295 A | 3/2000 | Hinderks |
| 6,041,359 A | 3/2000 | Birdwell |
| 6,049,551 A | 4/2000 | Hinderks et al. |
| 6,052,554 A | 4/2000 | Hendricks et al. |
| 6,055,244 A | 4/2000 | Wall, Jr. et al. |
| 6,078,961 A | 6/2000 | Mourad et al. |
| 6,085,235 A | 7/2000 | Clarke, Jr. et al. |
| 6,094,427 A | 7/2000 | Yi |
| 6,094,671 A | 7/2000 | Chase et al. |
| 6,101,180 A | 8/2000 | Donahue et al. |
| 6,115,040 A | 9/2000 | Bladow et al. |
| 6,115,750 A | 9/2000 | Dillon et al. |
| 6,128,374 A | 10/2000 | Hinderks |

| | | | |
|---|---|---|---|
| 6,144,702 | A | 11/2000 | Yurt et al. |
| 6,160,797 | A | 12/2000 | Robert, III et al. |
| 6,188,689 | B1 | 2/2001 | Katsube et al. |
| 6,205,473 | B1 | 3/2001 | Thomasson et al. |
| 6,205,485 | B1 | 3/2001 | Kikinis |
| 6,212,201 | B1 | 4/2001 | Hinderks et al. |
| 6,310,893 | B1 | 10/2001 | Yuan et al. |
| 6,351,727 | B1 | 2/2002 | Wiese et al. |
| 6,351,728 | B1 | 2/2002 | Wiese et al. |
| 6,359,882 | B1 | 3/2002 | Robles et al. |
| 6,373,927 | B1 | 4/2002 | Hinderks |
| 6,385,647 | B1 | 5/2002 | Willis et al. |
| 6,411,607 | B1 | 6/2002 | Robert, III et al. |
| 6,411,616 | B1 | 6/2002 | Donahue et al. |
| 6,490,551 | B2 | 12/2002 | Wiese et al. |
| 6,510,557 | B1 | 1/2003 | Thrift |
| 2001/0000457 | A1 | 4/2001 | Hinderks et al. |
| 2001/0038686 | A1 | 11/2001 | Hinderks |
| 2002/0082827 | A1 | 6/2002 | Wiese et al. |
| 2002/0105955 | A1 | 8/2002 | Roberts, III et al. |
| 2002/0177914 | A1 | 11/2002 | Chase |
| 2002/0194364 | A1 | 12/2002 | Chase et al. |

FOREIGN PATENT DOCUMENTS

| | | |
|---|---|---|
| CA | 2199360 | 6/2001 |
| DE | 33 13 841 | 10/1984 |
| DE | 34 40 613 | 4/1986 |
| DE | 36 38 922 | 5/1988 |
| DE | 36 45 150 | 5/1988 |
| DE | 42 37 366 | 5/1994 |
| EP | 0 372 601 | 6/1930 |
| EP | 0 139 803 | 5/1985 |
| EP | 0 174 636 | 3/1986 |
| EP | 0 271 805 | 6/1988 |
| EP | 0 343 792 | 11/1989 |
| EP | 0 510 247 | 8/1991 |
| JP | 63-128829 | 6/1988 |
| JP | 63-240228 | 10/1988 |
| JP | 1-188043 | 7/1989 |
| JP | 1-309489 | 12/1989 |
| JP | 3-278730 | 12/1991 |
| JP | 4-134995 | 5/1992 |
| JP | 5-103233 | 4/1993 |
| JP | 6-276169 | 9/1993 |
| JP | 5227164 | 9/1993 |
| JP | 5-290442 | 11/1993 |
| JP | 7-154347 | 11/1993 |
| JP | 6-133220 | 5/1994 |
| JP | 6-141005 | 5/1994 |
| JP | 7-153243 | 6/1995 |
| WO | WO 89/09965 | 10/1989 |
| WO | WO 92/10040 | 6/1992 |
| WO | WO 92/12599 | 7/1992 |
| WO | WO 92/17948 | 10/1992 |
| WO | WO 93/02412 | 2/1993 |
| WO | WO 93/09631 | 5/1993 |
| WO | WO 95/23493 | 8/1995 |
| WO | WO 96/08095 | 3/1996 |
| WO | WO 96/32710 | 10/1996 |

OTHER PUBLICATIONS http://www.cisco.com/univercd/cc/td/doc/cisintwk/ito.sub.—doc/ip.htm, 1992-2005, Cisco Systems, Inc.

"What is DaX?" Brochure, Copyright 1995, by Virtex Express Communications, L.L.C.

Infinity Boards the Musicam Express, May 8-21, 1995 by Radio, Inc.

Installation and Operation of the DaX, Manual, Apr. 25, 1995, pp. 1-16, by StarGuide Digital Networks.

"Musicam Express," Brochure, Copyright 1995, by Virtual Express Communications, L.L.C.

"The Very Least You Need to Know to Operate a DaX," Brochure, Jul. 1996, by Musicam Express, L.L.C.

"StarGuide II," Brochure, Copyright 1995, by Virtual Express Communications, L.L.C.

"WinDax User Guide," Manual, Copyright 1996, by StarGuide Digital Networks, INc.

"Draft AES recommended practice for professional audio—subjective evaluation of loudspeakers," Draft AES20-xxxx, Standards and Information Documents.

"Asymmetric Internet Access over Satellite-Terrestrial Networks," V. Arora, N. Suphasindhu, J.S. Baras, D. Dillon, Center for Satellite and Hybrid Communication Networks.

Precision Telephone Product Tester at bottom left, p. 297, located in Group 2900 library, B. A. Pargh Company, Inc. catalog.

"A Systems Approach to Non-Transcoded Audio Delivery, A Step Toward Digital Compability," Richard J. Becvar, Annual Proceeding of the National Association of Broadcasting, Mar. 20, 1994.

"ISO-MPEG-1 Audio: A Generic Standard for Coding of High-Quality Digital Audio," Brandenburg et al., J. Audio Eng. Soc., vol. 42, No. 10, Oct. 1994, pp. 780-792.

CDQ1000 Reference Manual, Revision 3.3, May 1994, CCS Audio Products.

CDQ2000 Reference Manual, Rev. 6.92-2, Jul. 27, 1994, CCS Audio Products.

CDQ2001 Reference Manual, Revision 2.2-3, Aug. 1994, Musicam USA.

"SpectraCast DR1000 Integrated Receiver Decoder," Crown Satellite, Mar. 1998.

"120/140 Mbit/s Portable HDTV Codec and its Transmission Performance in a Field Trial via Intelsat Satellite," Shuichi Matsumoto and Hitomi Murakami, 8376 Signal Processing Image Communications, Elsevier Science Publishers, vol. 4 , Nos. 4/5, Aug. 1, 1992, pp. 359-377, xp000293754, Amsterdam, NE.

"The Internet Multicast from ITS: How it was Done and Implications for the Future," Luis. F. M. de Moraes and Stephen B. Weinstein, IEEE Communications Magazine, Jan. 1995.

"The Motion Pictures Experts Group Digital Compression Standard and its Role in Satellite Systems," Frank Laczko, Proceedings of the 1993 IEEE National Telesystems Conference, Jun. 16-17, 1993, pp. 117-119, xp002163561, Atlanta, GA, USA.

"MPEG: A Video Compression Standard for Multimedia Applications," Didier Le Gall, Communications of the Association for Computing Machinery, vol. 34, No. 4, Apr. 1, 1991, pp. 46-58, xp000228788, NY, USA.

"Principles of Digital Audio," Ken C. Pohlmann, McGraw-Hill Video/Audio Professional, 4.sup.th edition, pp. 482-483.

"Infinity Boards the Musicam Express," Radio Ink, p. 10, May 8-21, 1995.

"Digital Audio Dictionary," Howard W. Sams, Prompt Publications.

"Introduction to Data Compression," Khalid Sayood, 1996.

"MCPC VSAT's for Rural Network," M. L. Sharma, Digital Satellite Communications, 1995, 10.sup.th International Conference, pp. 484-490.

Advertisement from ET/D of May 1978, Model 452, Simpson Electric Co.

"Digital Video and Audio Compression," Stephen J. Solari.

"AT&T, Starburst Offer Reliable, Satellite-Based Multicasting," StarBurst Communications Press Release, Apr. 2, 1996.

"Comet PC-to-PC File Transfer Application Software," Starguide Ditigal Networks, Inc. publication 1996 (2 pages).

"HSS High Speed ISA Bus PC Interface Board," Starguide Ditigal Networks, Inc. publication 1996 (2 pages).

"MPEG 2 Digital Video Decoder Module," Starguide Ditigal Networks, Inc. publication 1996 (2 pages).

"Musicam MPEG Layer II Digital Audio Decoder Module," Starguide Ditigal Networks, Inc. publication 1996 (2 pages).

"RS-422, V.35, RS-232C Clear Channel Synchronous Data Interface Module," Starguide Ditigal Networks, Inc. publication 1996 (2 pages).

"Specification for Satellite Data Broadcasting System Software v. 1.0," Starguide Ditigal Networks, Inc. publication Oct. 31, 1995 (7 pages).

"Virtual Bandwidth Network Management System, Users Guide," Starguide Ditigal Networks, Inc. publications 1996, pp. 1-83.

"Installation and Operation of the DaX," Starguide Digital Networks, Inc. publication Apr. 25, 1995, pp. 1-16.

"StarGuide II Satellite Recciver User's Manual," Starguide Ditigal Networks, Inc. publication, Rev. B Jun. 1996, pp. 1-56.

"RS-232 Asynchronous Services Statistical Demux Interface Module," Starguide Digital Networks, Inc. publication 1996.

Conway Phone-a-lyzer II, p. 96, Telephony's Buyer's Guide 1990/91.

"Telos Zephyr Digital Network Audio Transceiver User's Manual," (selected portions), Manual Version: Non-ISDN 1.0, Apr. 1994.

Clearlink IP Router Data Sheet, Tridom, released Jan. 26, 1997 printed from web page Feb. 5, 2003.

"VSAT Network Components," Tridom, released Jan. 26, 1997 printed from web page Feb. 5, 2003.

Clearlink System 100 Data Sheet, Tridom, released Jan. 26, 1997 printed from web page Feb. 5, 2003.

"Bandwidth On Demand Satellite Network Table Definitions," StarGuide Digital, version 2.0, Aug. 29, 1996, pp. 1-8, Virtex Communications, LLC.

"StarGuide Multiplexer User's Manual," Version 6.01, Oct. 5, 1996, pp. 1-26, Virtex Communications, LLC.

"Symphony Integrated Satellite Receiver Software High Level Design," Version 1.0, Apr. 28, 1995, pp. 1-24, Virtex Communications, LLC.

"Symphony Integrated Satellite Receiver Product Specification," Version 1.1, May 5, 1995, pp. 1-11, Virtex Communications, LLC.

StarGuide II Tracking brochure, 1995, Virtex Communications, L.L.C.

Musicam Express Brochure, 1995, Virtual Express Communications, L.L.C.

"Compression in Video and Audio," John Watkinson, 1995. .Webpage printouts, IDR V1000 Specification, WavePhore Networks, Dec. 10, 1997.

"WavePhore and SkyCache to Renovate Internat Backbone," webpage printout, WavePhore Networks, Mar. 11, 1998.

"Digital Video: The iPump," Wegener Communications, web page printed Feb. 5, 2003.

"Digital Video: The Unity 5000," Wegener Communications, web page printed Feb. 5, 2003.

"Digital Video: Unity Option Cards," Wegener Communications, 1999, web page printed Feb. 14, 2003.

"Digital Video: The Unity 401," Wegener Communications, 1999, web page printed Feb. 14, 2003.

"Modeling and Performance Analysis of File Transfer in a Satellite Wide Area Network," Oliver W. W. Yang et al., IEEE Journal on Selected Areas in Communications, vol. 10, No. 2, Feb. 1992.

"The Very Least You Need to Know to Operative a DaX" brochure, Musicam Express, L.L.C., Jul. 1996.

Fig. 17

METHOD AND APPARATUS FOR PUSH AND PULL DISTRIBUTION OF MULTIMEDIA

CROSS REFERENCE TO RELATED APPLICATION

This application is a continuation of application Ser. No. 09/263,801, filed Mar. 6, 1999 now U.S. Pat. No. 7,194,757, which in turn claims the benefit of U.S. Provisional Patent Application No. 60/077,147, filed Mar. 6, 1998, entitled METHOD AND APPARATUS FOR PUSH AND PULL DISTRIBUTION OF MULTIMEDIA, the disclosure of which is incorporated herein by reference.

FIELD OF THE INVENTION

The present invention relates to the distribution of multimedia from one location to another. More particularly, this invention relates to the automated distribution of digital media, most preferably by 'pushing' media to receiving units and 'pulling' media from distributing units.

BACKGROUND

There has long been a need for efficient methods and systems for distribution of differing types of media such as data, images, audio, or video information. In attempting to fulfill this need, a wide variety of types of systems have been developed, from manual systems such as postal and express physical delivery systems to digitized systems such as those built around wide area computing networks (WANs) and the Internet.

Manual systems suffer from a wide variety of problems, such as high cost, limited reach, unreliability, and time delay. The Internet and traditional e-mail types of distribution systems have become have become a much more omnipresent vehicle for distributing media, but the Internet presents significant problems for those seeking to reliably, efficiently, and quickly distribute digital media, particularly voluminous media files, to a variety of users.

In this regard, the Internet does presently support certain types of 'push' distribution and 'pull' distribution. Internet facilities such as traditional e-mail allow an Internet user to 'push' content out to many other Internet users (but usually not other types of users) through the Internet. Through the web and other facilities, the Internet allows Internet users (again, not others) to log onto web sites and 'pull' or download content from the sites. The Internet 'pull' model of distribution is unreliable and often quite untimely because it requires the receiving party to have access to the Internet and to initiate on its own the 'pull' or media download. Similarly, the Internet 'push' model of distribution is either: (i) unreliable and untimely because it does not accomplish any delivery at all until the intended receiving party logs onto the Internet and retrieves the pushed e-mail content from the party's e-mail facility; or (ii) expensive if the 'push' model is made more reliable by a permanent connection to the Internet by all desired receiving parties.

Moreover, while the Internet can serve as an effective platform for distribution of relatively small e-mail messages to those who have corporate or educational LANs permanently connected to the Internet 24 hours per day, 7 days per week, the Internet is not effective when timing of the reception is important and the sending and receiving entities either do not both have access to the Internet or are not both on-line to send and receive when needed. The Internet also suffers from well known bandwidth and other constraints that make it difficult, and often impossible, to rely on the Internet to distribute large media files, such as those containing images, audio, or video, for use by others who must receive and use such files in a timely fashion.

One approach to solving the problem of distribution of digital media has been to develop private wide area networks ("WANs") independent of the public Internet. Examples of these types of systems include corporate WAN's and the private WAN audio distribution systems deployed by companies like Digital Courier International and Musicam Express. (See U.S. Pat. No. 5,694,334 and the commonly-assigned co-pending application, Ser. No. 08/705,797, filed Aug. 30, 1996, entitled "Audio File Distribution and Production System"). These private WANs often consist of networks of (often specialized) personal computers linked through dedicated, private telecommunications types of links in order to produce and distribute digital information and media from one computer on the network to another.

These types of prior art WAN's have limited reach since they usually are connected only to those users who have systems connected to the WAN. They also typically have required dedicated telecommunications connections for each machine on the WAN in order to assure accessibility of, and push distribution to, each machine on the WAN. They also typically have required use of substantial expensive proprietary or non-standard software systems in order to reliably distribute voluminous media information, particularly audio or video content, throughout the WAN.

In addition, these prior art systems have typically required deployment of many thousands of expensive, customized PC's for use by each receiving or producing entity on the WAN. These types of WANs have thus not only required huge expense and effort required to manufacture, deploy, and install the customized PC's to establish the WAN and to achieve the distribution sought by the WAN, but also inherently limited the ability to easily and economically upgrade the installed base of PC's and other networking equipment over time when hardware upgrading is required or advisable (as it so often is in the rapidly evolving field of personal computers and telecommunications).

BRIEF SUMMARY OF ASPECTS OF THE INVENTION

The applicants have developed an integrated and automated system and method for reliably distributing digitized media information (preferably any type of digitized media information whatsoever) to multiple recipients. The present system and method includes push distribution through terrestrial and/or extraterrestrial facilities with confirmation of delivery from the recipients, and a combination push-pull distribution by a contact with the intended recipient (preferably without incurring any substantial communication charges) and a responsive pull or downloading of information by the recipient, also with confirmation by the recipient.

The applicants' system and method also preferably includes pull distribution, independent of the push/pull, allowing intended recipients to call in on their own and then select and download information. The system and method further preferably includes an automatic fallback method of physically shipping information to intended recipients that have not confirmed receipt of the media information through the other push, push/pull, or pull methods.

The preferred system and method also provides that many of those connected to the system may be producers of content for distribution to others through the system. In this fashion, producers can also be recipients of content from others on the system.

The preferred system and method also includes local hubs or proxy servers for the collection of content locally and distribution of that content to others connected to the hub, or to other hubs and their affiliated recipients. The system and method may also provide the ability to fax selected textual or graphic information to intended recipients.

The applicants' preferred apparatus and method also utilizes a flexible and powerful broadcast file transfer protocol for transfer of files through a one-way broadcast system, such as a one-way satellite system, into a TCP/IP (two-way) network.

These and other aspects of the present invention will become apparent as the specification proceeds. In this regard, it is to be understood that the scope of the invention is to be determined by reference to the claims and not to this Brief Summary.

OBJECTS AND ADVANTAGES OF THE INVENTION

It is an object of the present invention to provide a reliable and automated system and method for distribution of media information or content.

It is yet another object of the invention to provide such a system that can be used to distribute audio or text for national radio broadcasters.

It is an advantage provided by the applicant's invention that the present system and method can reliably distribute any type of media—data, images, audio, video, or multimedia.

Yet another advantage is that the present method and system can economically push content to recipients through efficient broadcast mediums such as satellite broadcasting systems.

A further advantage is that the present method and system provides confirmation of receipt to the party pushing or broadcasting the content.

A still further advantage is that the present method and system can also remotely activate intended recipients to perform a pull or download of content from the system, thus reducing or eliminating the need for continuous telecommunications connections typically required to push content to intended recipients, thereby also reducing or eliminating associated communication expenses.

An additional advantage is that the present method and system can allow recipients to independently pull permitted content whenever desired by the recipients.

Yet another advantage is that the present system works in conjunction with well established and widely available aspects of the Internet while not being dependent on the Internet to accomplish distribution of content, particularly high bandwidth content.

It is also an advantage of the present system and method to provide a fall-back manual system of delivery of content when all else fails or the intended recipient is not a part of the system.

Another advantage is that the present system and method allows the distributor and recipient to utilize or refrain from utilizing the Internet to accomplish distribution by, for example, accomplishing an extraterrestrial satellite broadcast to permissioned reception systems or by direct terrestrial connection independent of the Internet.

A related advantage is that the present system and method is very flexible and economical for both the system owner and operator and those who utilize the system to distribute content.

Yet another advantage is that the present system and method is easy to implement and does not require, or reduces the need for, costly hardware deployment or upgrades by the system owner or administrator over time.

An additional advantage is that the system and method can quickly, efficiently, and reliably distribute large, high bandwidth files, particularly audio and video files.

A related advantage is the ability of the system and method to broadcast files through a one-way broadcast network and feed the broadcast files into a two-way or TCP/IP network.

A yet additional advantage is that the present system and method also allows the distributor of the information to prioritize the information to be distributed in order to achieve the most economical distribution available in view of the prioritization, and to customize the contents of the package to reflect the identity and preferences of the sending party.

Another advantage of the present system and method is that those who use the system and method may readily, quickly, and economically access the central distribution management system to determine the nature and status of content provided to the management system for delivery to users.

Yet an additional advantage is that the producers and users of content may readily preview content produced or delivered to the user by the system and method.

There are many other advantages of the present invention. They will become apparent as the specification proceeds. It is to be understood, however, that the scope of the invention is to be determined by reference to the claims and not by whether a claimed embodiment necessarily achieves all the objects or advantages stated herein for the applicants' preferred embodiment.

BRIEF DESCRIPTION OF THE DRAWINGS

The applicants' preferred embodiment is described in the following section and shown in the accompanying drawings wherein:

FIG. 17 is a depiction of a sample appearance of the browser interface of FIG. 13 providing a user with additional detail about packages delivered or to be delivered by the applicants' preferred system and method.

DETAILED DESCRIPTION OF THE PREFERRED EMBODIMENT

Figure 1:
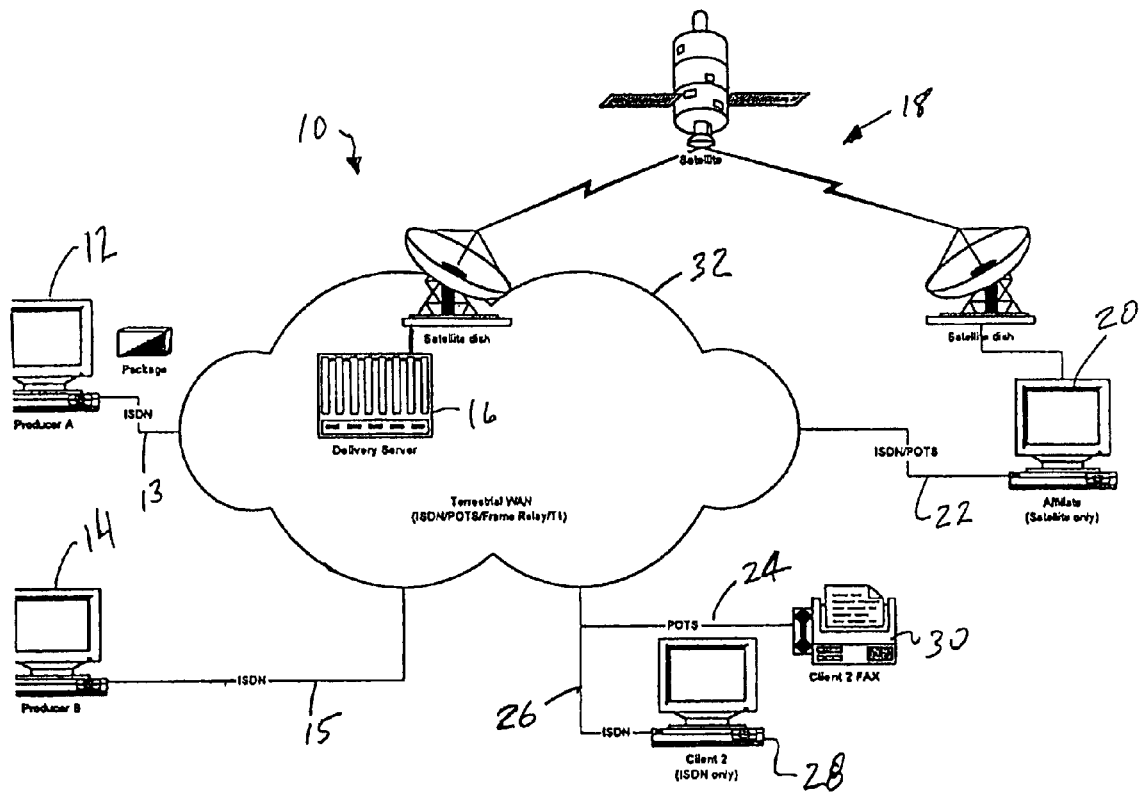
FIG. 1 is a schematic view of the applicants' preferred method and system, showing use of a delivery server that automates the delivery of digitized content through satellite and terrestrial connections.

With reference to FIG. 1, the applicants' preferred system and method generally consists of producer PC workstations, e.g., 12, 14, connected by two-way terrestrial telecommunications lines, e.g., 13, 15, to a delivery server, which is connected by a one-way satellite connection, generally 18, to satellite affiliate PC workstations, e.g., 20, and by two-way terrestrial telecommunications lines, e.g., 22, 24, 26, to both the satellite affiliates, e.g., 20, and general clients, e.g., 28, 30. The two-way communications lines, 13, 15, 22, 24, 26 may be POTS (plain old telephone system), ISDN, Frame Relay, xDSL, or T1 lines. The two-way communications lines 13, 15, 22, 24, 26 may connect to a terrestrial WAX (wide area network) 32, to which the delivery server 16 is also connected. The WAN 32 may consist of a private network (such as an intranet) or the public Internet.

The one-way satellite connection 18 provides a high-bandwidth vehicle for distribution of media files, particularly larger audio or video files, to affiliates, e.g., 20, and clients, e.g., 28, 30, such as radio or television stations. Because the satellite connection 18 is only a one-way connection, the connection 18 can suffer from link errors, lack of acknowledgement, and availability problems. As will be explained in greater detail below, the applicants' system and method thus also provides two-way connections 13, 15, 22, 24, 26 for confirmation of delivery and back-up telecom delivery. The system and method also includes a fall-back manual delivery facility when automated delivery cannot be accomplished through the facilities shown in FIG. 1.

With continuing reference to FIG. 1, the delivery server 16 consists of six 400 MHz Pentium II IBM-compatible PC's (not shown), two of which constitute redundant file servers, two of which constitute redundant communications servers, and two of which constitute redundant system administration servers. The file servers (not shown) each have a 100+GB hot swappable hard drive, and run Windows NT File Server. The communications servers (not shown) each have a telephone modem pool (TAPI compliant), an ISDN modem pool (TAPI compliant), and a T1 adapter and run Windows NT Server. The system administration servers each have a 6 GB hard drive and run Windows NT, POP3 Server, FTP Server, WWW Internet Server, Octopus real-time mirroring, and system software described in greater detail below. The file servers, communications servers, and administration servers are all interconnected on a 100 MHz Ethernet Local Area Network (LAN) 39, with standard Ethernet LAN cards mounted in each such server in a fashion well known to those of skill in the art.

The producers, e.g., 12, 14, preferably consist of an IBM compatible Pentium PC, with 4 GB of hard disk space, 64 MB of RAM, a color monitor, a mouse, a keyboard, 2 or more serial ports, an ISDN modem connected to an ISDN line, and DAC Card (by Musicam USA, Holmdel, NJ.) or Digigram Card (with suitable driver for the particular card installed on the workstation), and stereo speakers. The producers also are loaded with off-the-shelf software such as Windows NT Workstation 4.0 or higher, Microsoft Internet Explorer 4.0 or higher, Microsoft Mail, and a TAPI compliant modem driver.

The producers, e.g., 12, 14, produce electronic, digital packages 34 of media information (not shown in FIG. 1), which the delivery server 16 then stores and delivers to end-user satellite affiliates, e.g., 20, and clients, e.g., 28, 30, pursuant to instructions contained in the digital media packages 34. As will be explained below, the digital media packages 34 can include any type of digital media whatsoever, such as audio, video, text, hypertext, images, programs, data files (such as the addressing instructions or destination address list noted above or other data), etc. For example, for a radio broadcasting application, the package 34 will include one or more 30 or 60 second digitized audio advertisements (also called "spots"), a faxable instruction list, purchase order references, and an address list.

Figure 2:
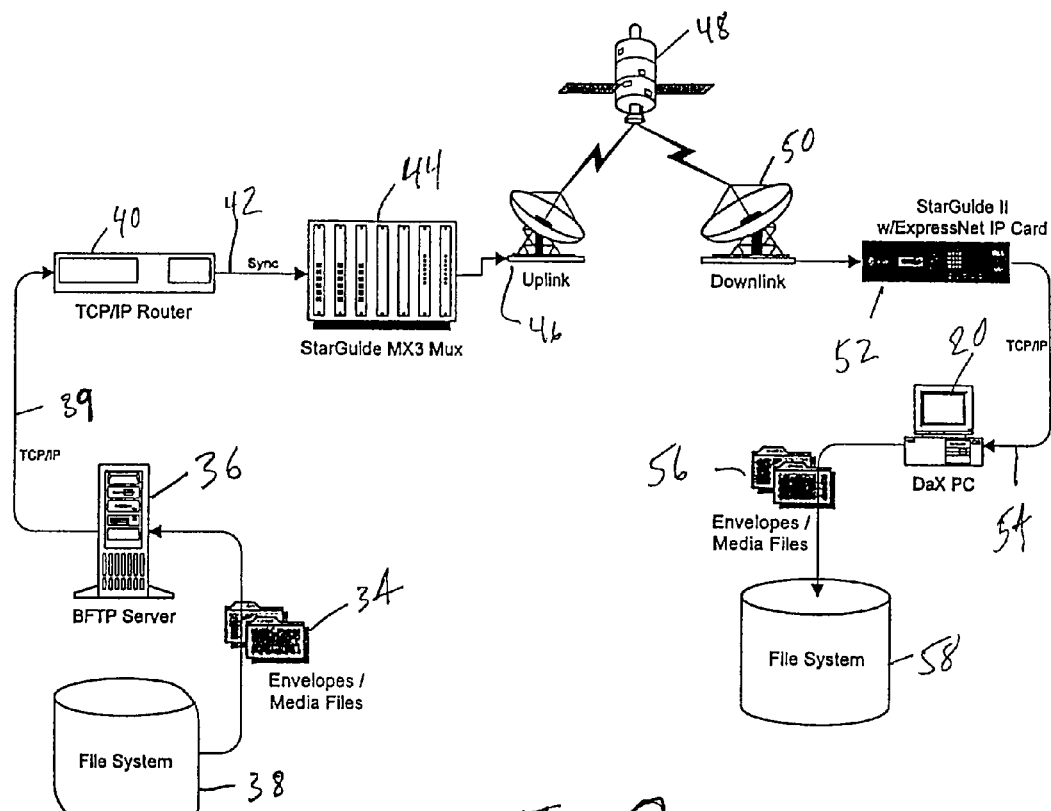
FIG. 2 is a schematic view of the satellite transmission portion of the applicants' preferred method and system, showing use of the applicants' preferred StarGuide® satellite uplink and downlink/receiver-router.

As will also be explained in further detail below, the delivery server 16 checks the contents of each digital package 34 and ensures that any value-added services required for the package 34 have been performed prior to forwarding the package 34 pursuant to the addressing instructions (not shown in FIG. 1). The delivery server 16 thus checks to make sure that the digital package 34 includes an address list and all required contents for the package 34. When received by an affiliate 20 or client 28, 30, the affiliate/client user interface allows the user to display on the PC screen the packages 34 the affiliate or client 20, 28, 30 has received and their associated content, and to organize, preview, or otherwise utilized the digital media files contained within the packages. In the radio broadcasting application, for example, the affiliate or client 20, 28, 30 may play and broadcast the received audio content by merely clicking on the file indicator for the audio content, as explained below. The satellite connection 18 of the preferred embodiment is shown in FIG. 2. The delivery server's redundant file server, e.g., 36, maintains a file system 38 of packages or envelopes 34 and their associated media files. The file server 36 runs Broadcast File Transfer Protocol ("BFTP") service (explained below) and is connected by two-way TCP/IP connection 39 to a TCP/IP router 40, that supports IGMP version 2 multicasting. The router 40 is preferably a CPA 2503 router made by Cisco Corporation.

The multicast router 40 is in turn connected by a synchronous connection 42 to a StarGuide® VIF card in a StarGuide MX3® Multiplexer or Mux 44 (all StarGuide® products identified herein are available from StarGuide Digital Networks, Inc., Reno, Nev., and San Diego, Calif.). The output of the Mux 44 is fed through a satellite uplink 46, then through a third party satellite 48, and into a satellite downlink 50 in a fashion, and with additional associated equipment (amplifiers, modems, LNB's, etc. (not shown)), well known to those skilled in the art. The satellite signal is then fed from the downlink 50 into a pre-permissioned StarGuide II® Satellite Receiver 52 in a fashion well known to those skilled in the art. The Receiver 52 has a StarGuide® Ethernet Card (not shown). The StarGuide II® Receiver 52 thus demultiplexes the signal received from the satellite 48 and sends the IP portion of the signal (called a "service") to the StarGuide® Ethernet Card. In turn, the Ethernet Card provides TCP/IP IGMP multicast protocol output through a 10-Base-T Ethernet cable 54 to a satellite affiliate PC, e.g., 20. Preferably the TCP/IP uplink connection 38 and TCP/IP downlink connection 54 is an Ethernet network or similar connection, which are well known to those skilled in the art.

With this equipment, the envelopes and associated media files 34 may be broadcast efficiently by satellite to those StarGuide II® Receivers 52 pre-permissioned (through the StarGuide® NMS that controls the Mux 44) to receive the broadcast so that the affiliate PC's, e.g., 20, associated with each such permissioned Receiver 52 can receive and store the received envelope and associated media files 56 in a file system 58 on the affiliate PC, e.g., 20. In this regard, the BFTP protocol (explained below) ensures that the received envelope and media files 56 are identical to the transmitted envelope and media files 34.

Figure 3:
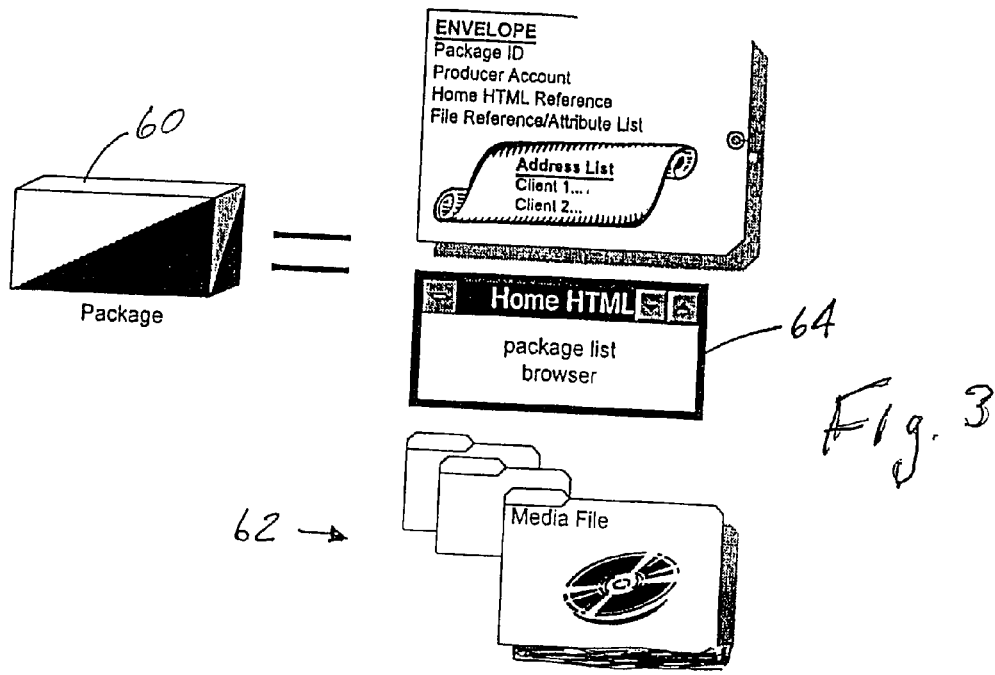
FIG. 3 is a schematic view of the envelope structure used by the applicants' preferred method and system, in order to package and deliver files through the system.

With reference to FIG. 3, the system 10 of FIGS. 1 and 2 actually delivers more than just envelopes, e.g., 34, with associated media files. The system actually delivers packages of information, e.g., 60, which include an envelope 61, the associated media or data files 62, and optionally a home HTML page 64 (which preferably includes the producer's logo or web-page indicia). The envelope 61 is an ASCII text file that includes a unique package identifier, a producer account identifier, a reference to the home HTML page, a listing of associated media files and logo, a client or affiliate address list, and other ancillary information such as date, priority, media file description, file code, and file size. The envelopes, e.g., 61, are delivered through the terrestrial portion of the network or system 10 via common e-mail protocols such as the SMTP or POP3 protocols. As noted above, the envelopes 61 addressed for satellite affiliates are also broadcast over the satellite 48 using the BFTP protocol.

Figure 4:
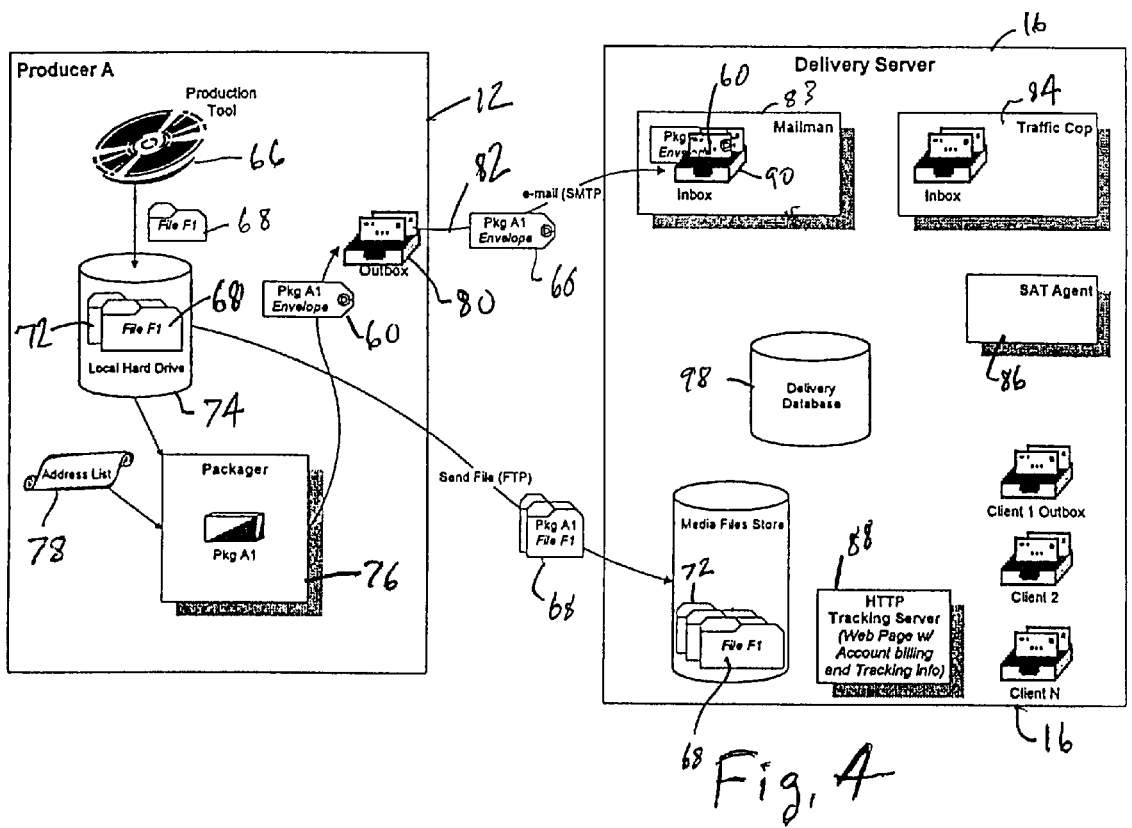
FIG. 4 is a schematic view showing how data and files flow through the applicants' system on the delivery side of the system shown in FIG. 1.

With reference now to FIG. 4, a producer workstation, e.g., 12, includes third-party production tools 66 such as an audio encoder (preferably, a Musicam USA Dac card, a Digigram card, or other MPEG software or hardware encoder), a video encoder, and a word processor. For audio and video files generated by the encoders, the resulting audio or video files have ISCI-identifiers, which are well known to those skilled in the art, and all the produced files, e.g., 68, 70, 72, are stored on the producer's hard drive 74. Through use of the producer packager software 76, an operator of the producer 12 utilizes standard Windows 95 or NT drag and drop tools to assemble the media files 68, 70, 72 into a package 60, such as shown in FIG. 3 and described above. The operator of the producer workstation 12 preferably next selects the client or affiliate names from a global address list 78 (automatically downloaded to the producer 12 periodically by the delivery server 16) and also possibly from a private address list (not shown) stored on the producer 12. Addresses that are private and not global will receive packages and files by manual, not automated, delivery as described below. Whenever the operator addresses a package for delivery to an address that is not on the global list, the producer software warns the operator of the inability to send to that address other than by such manual means.

The packager application 76 adds the other information to the package 60 such as shown in FIG. 3, and the operator of the producer workstation 12 may hit a "send key" (not shown) on the user interface for the application 76. This causes the packager application to queue the package 60 for immediate submission to the delivery server 16. A submitting or outbox agent 80 on the producer 12 then calls into the delivery server 16 via a two-way telecommunications line 82 supporting the TCP/IP protocol. Preferably the telecommunications line 82 is an ISDN or faster connection. The outbox agent 80 then utilizes the FTP protocol to transfer all media or data files, e.g., 68, 72, in the package 80 to the delivery server 16 and simultaneously e-mails the envelope for that package 80 to the delivery server 16. The producer 12 relies on its own production and Windows 95 or NT file management tools in order for any operator to delete media files generated by the producer 12.

Figure 5:
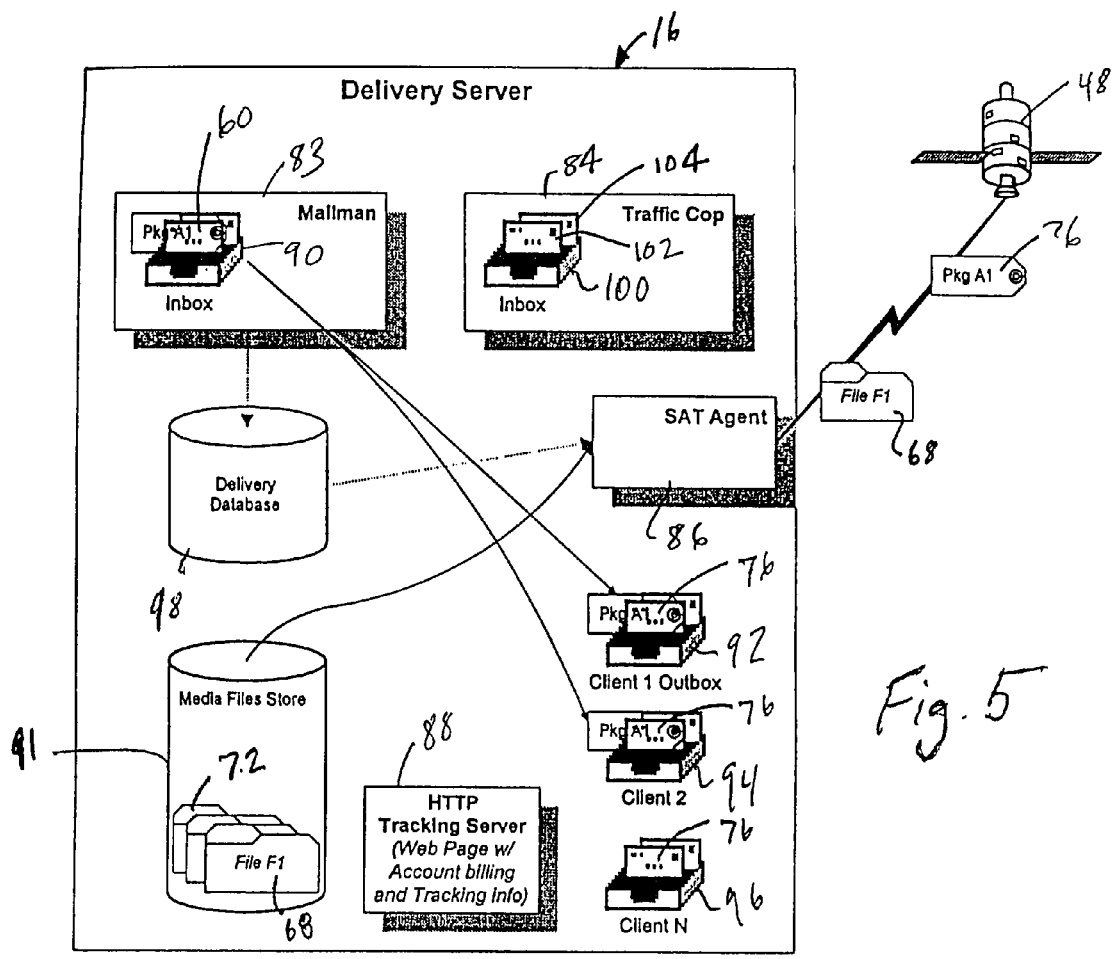
FIG. 5 is a schematic view showing how data and files flow from the delivery server to the satellite uplink for broadcast through the satellite.

With reference to FIGS. 4 and 5, the delivery server 16 runs, among other things, a mailman software agent 83, a traffic cop software agent 84, a satellite software agent 86, and web-site software 88. The mailman agent 83 continuously scans its software inbox 90 for envelopes, e.g., 60, submitted by producers (not shown in FIG. 4). On detection of an envelope 60 in the inbox 90, the mailman agent 83 reads the envelope 60, determines the identity of the associated files 68, 72, and verifies that the delivery server 16 has received all files 68, 72 identified in the envelope 60, completed any value-added services for the envelope 60 or its associated files 68, 72, and stored them on a hard disk 91 on the delivery server 16. After all such files 68, 72 are stored on the hard disk 91, the mailman agent 83 e-mails the envelope 60 to all clients, e.g., 92, 94, 96 addressed in the envelope 60, according to addresses stored in a delivery addressing database 98 also stored on the delivery server 16. In the event that any client 92, 94, 96 is also a satellite affiliate 20 as explained above, the mailman agent 83 also submits the package 76 (i.e., the envelope 60 and its associated media files 68, 72) to the satellite agent 86, which queues the package 76 for repeated broadcasting over the satellite 48 to the satellite affiliates addressed in the envelope 60. As soon as the satellite agent 86 completes the satellite broadcast of the package 76, it flags the package 76 as sent to the satellite affiliate 20.

Referring again to FIGS. 4 and 5, in the event that either (i) any client 92, 94, 96 is not on the global address list maintained in a database 98 on the server 16, or (ii) the server 16 (i.e., the traffic cop agent 84) has not received confirmation of delivery from a given client, e.g., 92, or satellite affiliate within a predetermined time after receipt of the package 76 by the server 16, the mailman forwards the envelope 60 to a "duplication house" outbox on the server 16, for subsequent forwarding of the envelope 60 and its associated files 68, 72 to the duplication house for manual delivery to each such client or affiliate. Thus, the traffic cop agent 84 monitors its inbox 100 for e-mail confirmation, e.g., 102, 104, of the receipt of packages, e.g., 76, by the clients to whom the packages have been addressed as explained above. On receipt of such confirmation 102, 104, the traffic cop agent 84 updates the addressing and delivery database 98 with a confirmation of the delivery.

The server's web-site software 88 maintains a standard, Internet-accessible web site (not shown) via a modem pool and Internet connections (not shown) maintained on the server 16 in a fashion well known to those skilled in the art. The web-site provides authorized producers, clients, affiliates, and others (not shown) with the ability to log-in to the server web-site by use of an account number and password, and to view information about the status of their packages managed or delivered by the server 16. Standard web-site browser tools (such as the Microsoft Internet Explorer and Netscape Navigator) allow the producers, clients, affiliates, and other permitted users to view their account and package delivery information on the server web-site, twenty-four hours per day, seven days per week.

The web-site software 88 provides the following search capabilities for those clients or affiliates who log into the web-site on the server 16:
Search/sort by producer's purchase order number
Search/sort by submission date
Search/sort by server assigned package identification As a result of the password protection on the web-site, those who access the site with their password are granted access to the site but only allowed to access information submitted by account associated with the password.

The server 16 also maintains the global address book for downloading of the address book to the producers, e.g., 12. This global book is updated automatically as new affiliates, clients, and producers register with the delivery server 16. The server 16 provides an on-line registration capability for affiliates or clients accessing the server web-site described above.

A clean-up or archiving process (not shown) may be added as a back office operation to allow an operator to delete or archive any envelopes, e.g., 20, that have expired according to the expiration date for the envelope. The clean-up process could also delete any media files that are not identified in any envelopes, e.g., 20, on the server 16.

The server 16 can also run a fax agent (not shown). The mailman can monitor document files in received envelopes to determine if any document is marked with a fax attribute, and for any such document, forward it to a fax server such as Microsoft Exchange's fax service (not shown). The fax server then automatically faxes the document to the fax numbers requested in the envelope.

Figure 6:
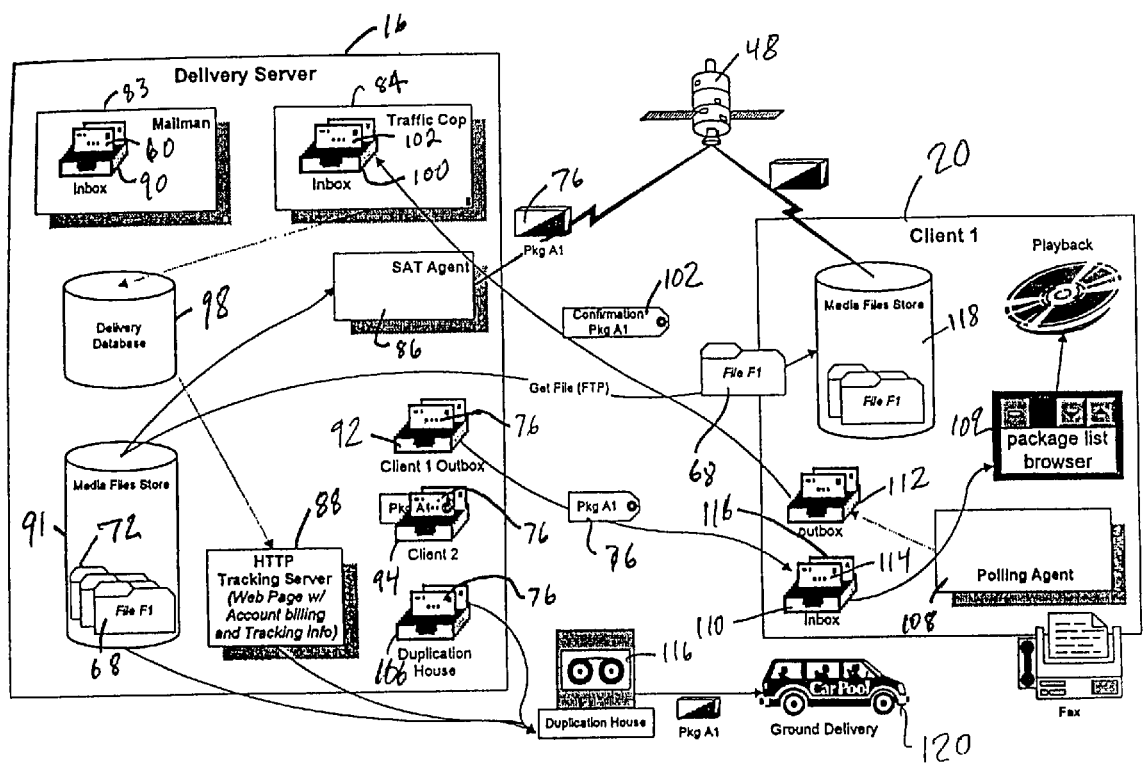
FIG. 6 is a schematic view expanding on the functions of the delivery server shown in FIG. 5 and showing how the delivery server also manages the delivery of data and files through terrestrial telecommunications connections and through manual delivery services.

Referring now to FIG. 6, the client or affiliate workstation runs affiliate software including a polling agent 108 that automatically places a phone call to the delivery server 16 at intervals or specific times set by the delivery server 16 or upon receipt of a "tickle" or triggering communication received from the delivery server 16. The tickle takes place by the server 16 dialing the phone number for the affiliate or client 20 in order to cause one or two telephonic rings to take place on the modem of the affiliate or client 20 through the two-way POTs or ISDN communication line, e.g., 22 of FIG. 1. The affiliate or client modem (not shown) is set so that it will not answer with only two rings. A tickle monitor associated with the polling software 108, however, monitors the modem (through the Microsoft Telephone API (TAPI) facility) and recognizes the ringing or tickle, which causes the polling agent 108 to call the delivery server 16 (or any other alternative server (not shown) available to the affiliate or client), log-in to the server 16 (including by use of a unique and secure password), and pick-up any packages waiting at the server 16 (or alternative server, not shown) for delivery to the client or affiliate 20. In this regard, upon connecting to the server 16, the client or affiliate 20 exchanges any awaiting messages with the server 16 and, via its package list browser 109, checks its inbox 110 for any newly arrived messages or envelopes, 114, 116. Upon review of the newly received envelopes 114, 116 (including receipt of any such envelopes by satellite in the case of a satellite affiliate), the delivery agent (not shown) running in association with the browser 109 determines if any envelopes 114, 116 identify any packages or files that have not already been otherwise received by the client or affiliate 20 and stored on its hard disk 118. For any file not already present on the hard disk 118, the delivery agent requests and obtains an FTP transfer of the missing file from the server 16 to the client or affiliate hard disk 118 associated with the delivery agent. Upon automatic completion of these tasks and transfer of all envelopes and files addressed to the client or affiliate 20, the client or affiliate 20 hangs up automatically.

In this fashion, the server 16 accomplishes a combination push-pull of the package(s) for the client or affiliate 20. The 'push' takes place by tickling the client or affiliate 20 to inform it that the server 16 has content to deliver to the client or affiliate 20. The client or affiliate 20 then responds to the push or tickle by calling into the server 16 to pull the content from the server 16. The push takes place at no economic cost to the system and method, and with minimal effort. The pull and delivery of intended content to the client or affiliate 20 then takes place at the expense of the single phone call to the client or the affiliate 20 (unless otherwise arranged by the system administrators or users), with no need for any permanent or dedicated two-way connection between the server 16 and client or affiliate 20, and with a relatively high degree of security.

Whenever the delivery agent determines that the contents of a given package (as identified in the envelope for the package) are completely received by the client or affiliate 20, the delivery agent causes the client or affiliate 20 to take two additional actions. First, the client or affiliate 20 sends an e-mail to the server 16 confirming the delivery of the package to the client or affiliate 20. Second, the delivery agent flags all received packages, along with the packages' respective home-HTML information (64 in FIG. 3), for display to a user through the browser interface 109 at the client or affiliate 20.

The browser interface 109 on the client or affiliate 20 is based on the Microsoft Internet Explorer. As explained in greater detail below, the browser 109 provides a package hierarchy, inbox, and trash bin, and utilizes HTML for its package lists, so that received media files can be conveniently previewed, auditioned, or played.

Each server 16, producer 12, and client or affiliate 14 maintain substantial database information in addition to that already identified above. The server 16 maintains its database information in Microsoft SQL running on the server 16. The producers 12 and clients and affiliates 14 maintain their database information in the standard Windows 95 or Windows NT registry provided by the operating system on the clients and affiliates 14.

The data maintained in the server SQL database is as follows:
Producer Account
1. Unique producer reference name
2. Contact person at producer
3. Producer billing address
4. Producer fax telephone number
5. Producer password
6. Unique producer account number
Client (or Affiliate) Account
1. Unique client reference name
2. Contact person at client
3. Client shipping address
4. Client fax number
5. Client e-mail address
6. Client communication line types (satellite, ISDN, POTs, Drop-ship)
7. Delivery visibility: package type filtering (any package, audio-spot-packages, video-spot-packages, etc.) This field hides clients from producers that do not generate packages of the type for the hidden clients.
8. Polling schedule.

(Note that the Global Address Book is derived from this client-account information.)

Package (Identified from Envelope Submitted by a Producer)
1. Unique package identification
2. Package subject (display name)
3. Package type (generic, audio-spot-package, video-spot-package, etc.)
4. Unique producer reference name
5. Producer reference purchaser order number
6. Submission time stamp
7. Delivery priority (one week, two-day, next-day, two-hour, one-hour)
8. Value added service options (manual addressing, media previewing, quality assurance, etc.)
9. Delivery flag (value-added services completed, forward to satellite agent, forward to non-satellite clients, forward to all)

Delivery Target Record (e-mailed from client as described above)
1. Unique client reference name
2. Unique package identification
3. Delivery timestamp
4. Delivery state (hold, submitted, forwarded, confirmed)

Envelope (Content Submitted by Producer Via e-mail)
1. Unique package identification
2. Package subject (display name)
3. Package type (generic, audio-spot-package, video-spot-package, etc.)
4. Unique producer reference name
5. Producer reference purchaser order number
6. Submission time stamp
7. Delivery priority (one week, two-day, next-day, two-hour, one-hour)
8. Value added service options (manual addressing, media previewing, quality assurance, etc.)
9. File list (filename and attributes)
10. Address list (unique client identifications)
Note: Items 5-8 and 10 immediately above are not forwarded to the clients or affiliates. File attributes include date, size, CRC, unique reference name, and home-HTML.

Client Tickle Record
1. Unique reference name
2. Tickle status (0=none, 1=to be tickled, 2=tickle succeeded, 3=tickle failed)
3. Timestamp of last tickle status
4. Status summary of last dial-in (e-mailed from client)
5. Timestamp of last connection Log Message
1. Unique client reference name
2. Log timestamp
3. Level (log, warning, error, fatal)
4. Generation application
5. Message The database maintained by the client (affiliate) registry is as follows:

Configuration
1. Dial schedule (e-mailed to client from server)
2. Line types: satellite, ISDN, POTs Package
1. Envelope (see above)
 A. Unique package identification
 B. Package subject (display name)
 C. Package type (generic, audio spot, video spot, etc.)
 D. Producer name
 E. File list (filename & attributes)
2. Status flags (envelope received, media files in progress, media files complete, package viewed, package deleted)
3. Display folder (default inbox, recycle folder schedules it for deletion)

Folders
1. Name (e.g., "Inbox" and "inbox\Media World")

Phone Book
1. Primary server: phone number & line type (ISDN/POTs)
2. Backup server: phone number & line type (ISDN/POTs)

The data maintained in the producer registry is as follows:

Configuration
1. Line types: satellite, ISDN, POTs

Package
1. Envelope (see above)
 A. Unique package identification
 B. Package subject (display name)
 C. Package type (generic, audio spot, video spot, etc.)
 D. Producer name
 E. File list (filename & attributes)
 F. Address list
2. Status flags (envelope received, media files in progress, media files complete, package viewed, package deleted)
3. Display folder (default inbox, recycle folder schedules it for deletion)

Folders
1. Name (e.g., "Inbox" and "Inbox\Media World")

Phone Book
1. Primary server: phone number & line type (ISDN/POTs)
2. Alternate server: phone number & line type (ISDN/POTs)

Referring again to FIG. 6, the delivery server 16 is able to generate a comprehensive list of packages, e.g., 76 that are to be manually shipped to clients or affiliates 20 that have not or cannot receive the package by satellite or by terrestrial (ISDN or POTs) connections. The delivery server 16 maintains an outbox 106 for the manual delivery service. The manual delivery service can log onto the server 16 to procure the list of packages, e.g., 76, for manual delivery and associated files for physical duplication of the file(s) for each package onto a physical media, such as a tape 116 or CD (not shown), for ground delivery 120 or other manual delivery such as by a combination of air express and ground delivery 120.

Figure 7:
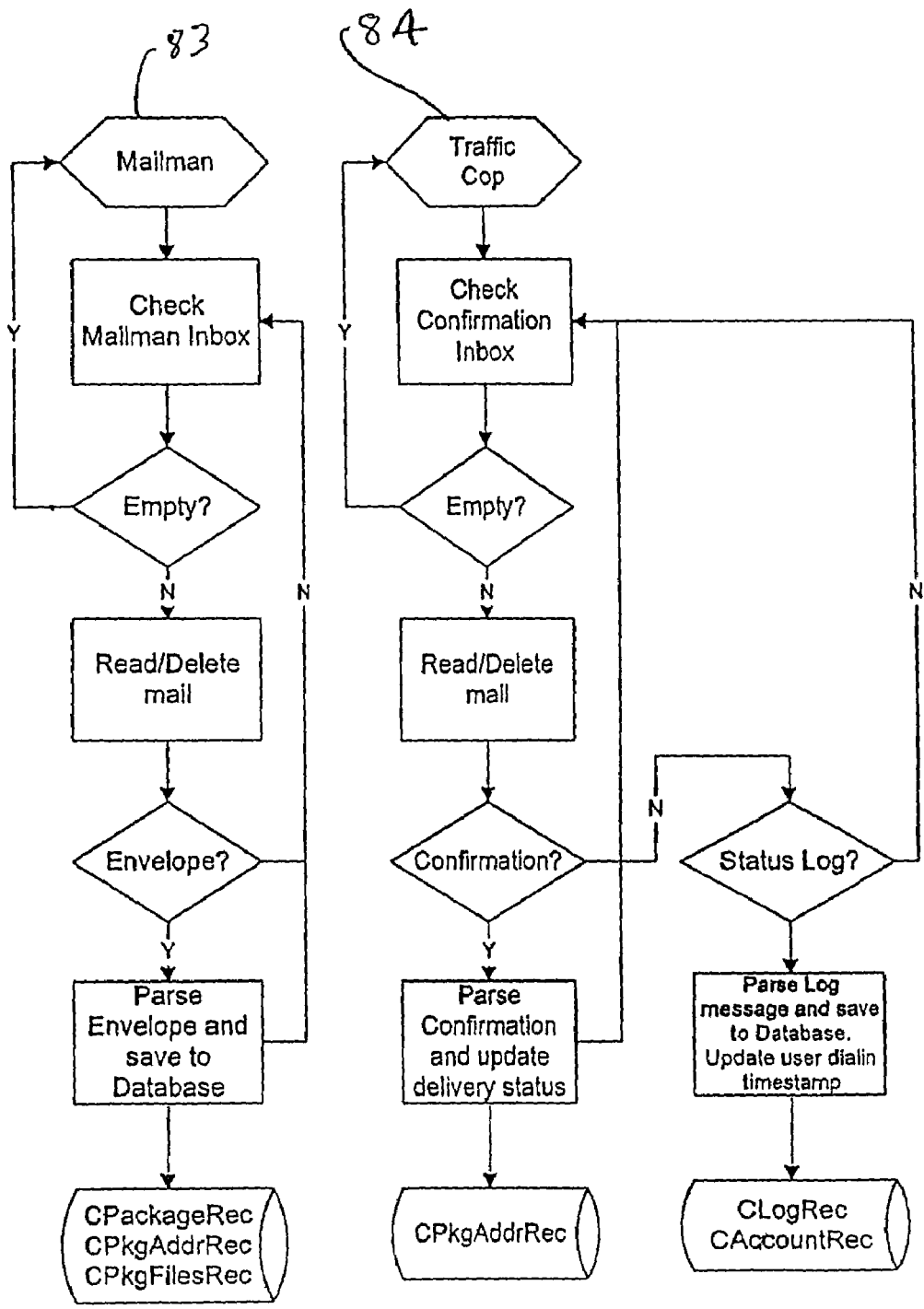
FIG. 7 is a flow chart showing how the Mailman and Traffic Cop routines run in the Mailroom application on the delivery server.

The mailman 83 and traffic cop 84 applications, as shown in FIG. 6, operate according to the flow chart shown in FIG. 7. These two applications 83, 84 monitor their respective inboxes 90, 100 to receive and process envelopes, e.g., 60, and status confirmations, e.g., 102.

Figure 8:
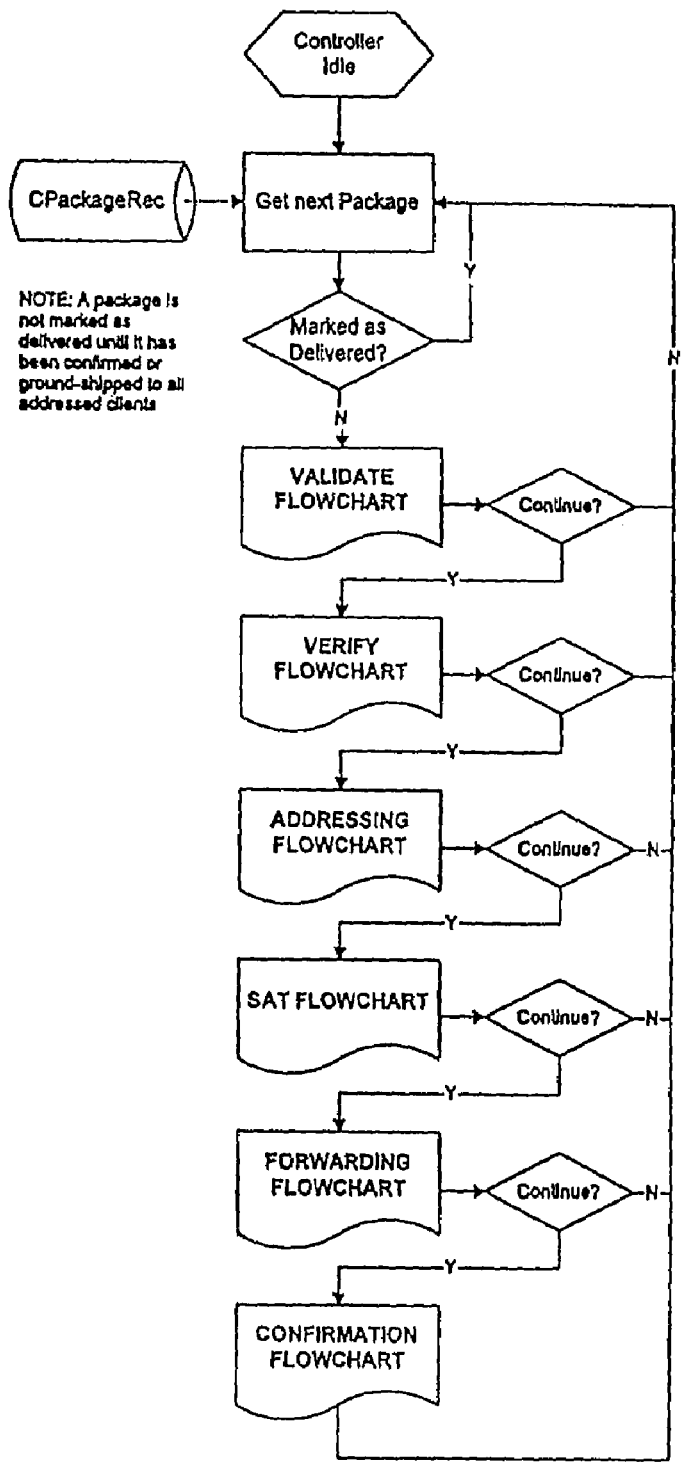
FIG. 8 is a flow chart showing how the Mailroom application operates on the delivery server.
Figure 9:
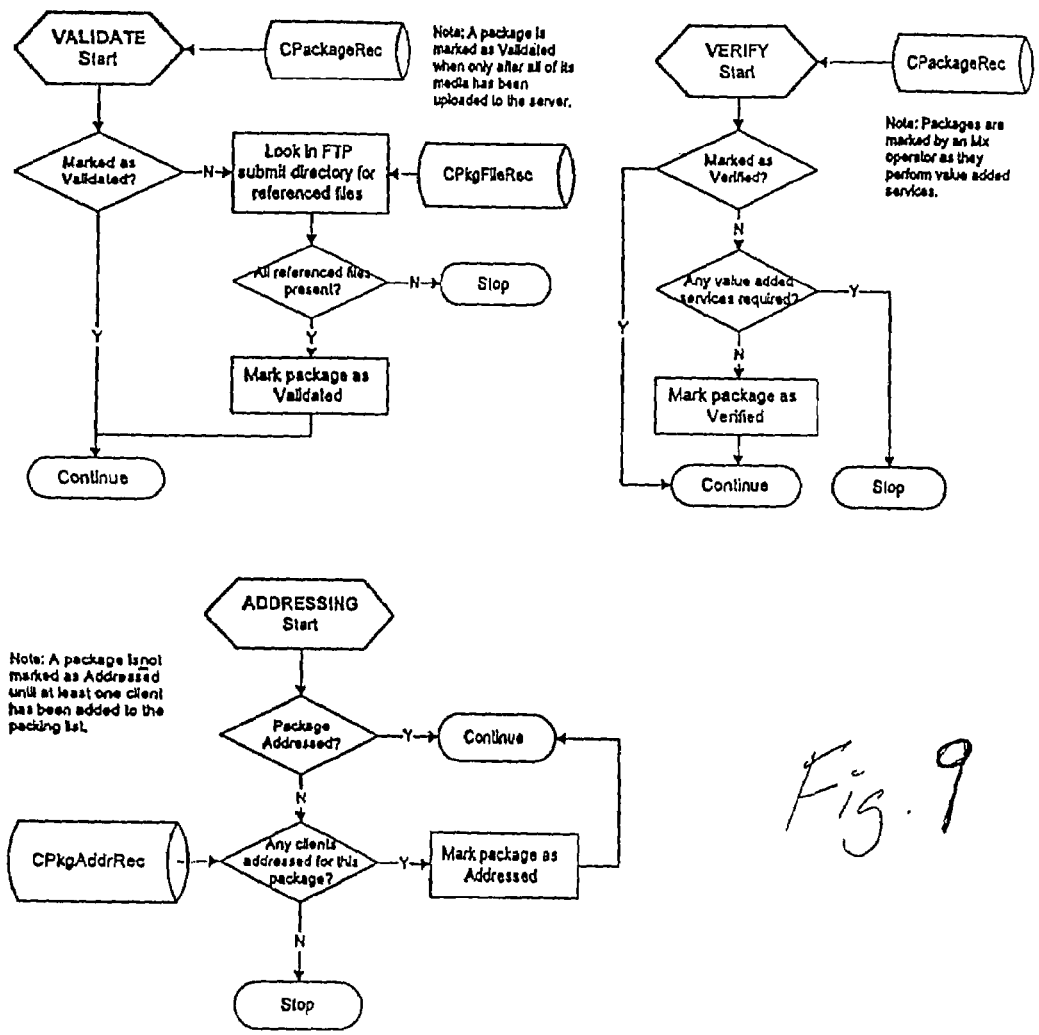
FIG. 9 shows the sub-flow-charts, Validate, Verify, and Addressing, generally referenced and shown in FIG. 8.

Referring now to FIG. 8, the delivery server 16 also runs a core mailroom application shown in FIG. 8. The mailroom application consists of the processes shown in FIG. 8 along with the sub-processes (validate, addressing, and verify) shown in FIG. 9, and the sub-processes (satellite, forwarding, and confirmation) shown in FIG. 10. In essence, the mailroom application processes and forwards, as shown in FIG. 6, the envelopes, e.g., 60, and confirmations, e.g., 102, saved into the central database 98 by the mailman 83 and traffic cop 84 applications of FIG. 7. The mailroom thus decides when, where, and how to forward packages, e.g., 76, to clients or affiliates, e.g., 20, as shown in FIG. 6.

Figure 10:
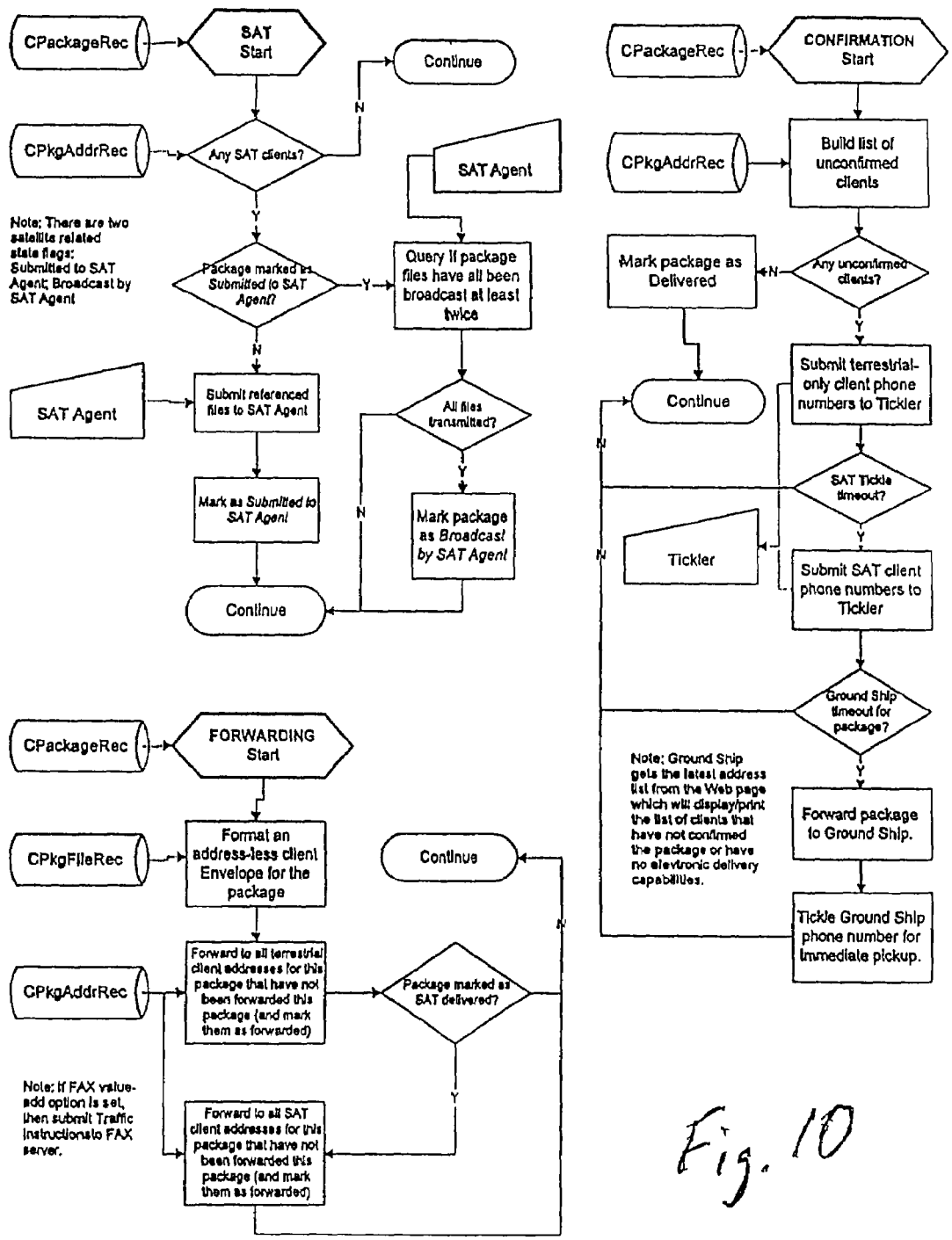
FIG. 10 shows the sub-flow-charts, Sat, Forwarding, and Confirmation, generally referenced and shown in FIG. 8.

The tickle or tickler application referenced in FIG. 10, and noted above, is a self-running application on the delivery server 16. When the delivery server 16 requires that a package must be picked up immediately by a client or affiliate 20, the mailroom agent on the server 16 submits a request to the tickler application to dial out and ring the specified client or affiliate. As also noted above, the client's tickle monitor detects the ring and dials out to the server 16 (or an alternate server (not shown) which may be a local, Internet ISP, or other server of packages for the client) so that the client may pull its packages from the server as described above.

With reference to FIG. 6, the affiliate or client 20 also runs a warehouse manager application (not shown) also noted above. The warehouse manager is the high-level communications server for the user interface of each client or affiliate 20. The warehouse manager manipulates the client database described above as directed by the client or affiliate through its graphical user interface (the "browser"): The warehouse manager thus maintains the package hierarchy, performs garbage collection and deletion of obsolete files, maintains the activity and error log, and notifies the client or affiliate browser of newly arrived packages.

Communications between the warehouse manager and client or affiliate graphical user interface take place through standard interprocess communications protocols such as TCP/IP and HTTP. The warehouse manager also runs a garbage collection process, which (i) removes expired packages after their respective kill or expiration dates, and (ii) purges the oldest media in the recycle bin, whether it has expired or not, as disk space lowers past a threshold.

The mailroom agent noted above is responsible for fetching packages using e-mail and FTP, tracking incomplete packages, and then adding the completed packages to the warehouse manager.

Still referring to FIG. 6, each satellite affiliate 20 also runs a satellite agent application, called a BFTP receiver. This application saves all files that it receives from the satellite broadcast via the BFTP protocol explained below.

The producer and client user interfaces are similar. For example, with reference to FIG. 11, the producer interface (not shown) appears much like the client interface 122 but with the toolbar 103 of FIG. 12 rather than the client or affiliate toolbar 105 shown in FIG. 11. The producer interface has:

1. a tree structure to organize folders and packages;
2. an "outbox" folder containing outgoing packages (see outbox 80 in FIG. 4);
3. capability to create, delete, rename, and remove folders;
4. capability to delete and move packages;
5. a search and sort utility for packages;
6. a tool for previewing or auditioning media files (e.g., for playing an audio file through an audio card in the producer workstation);
7. an archiving agent that archives packages after their associated expiration dates;
8. a transaction log and word processing tool for viewing and printing the log; and
9. compatibility with Microsoft Explorer (preferably version 4.0 or higher).

Figure 11:
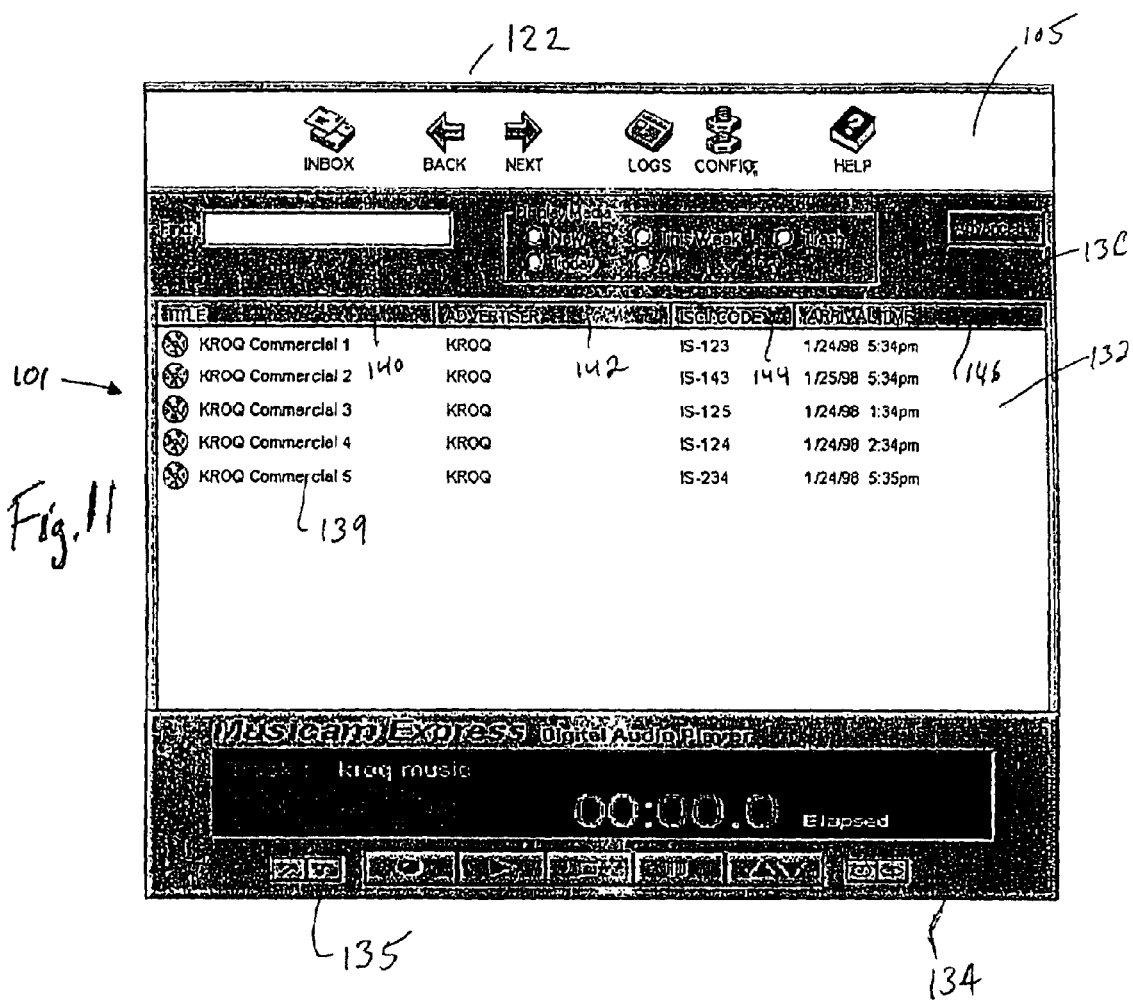
FIG. 11 is a depiction of the user interface for users running the applicants' system on the receiving or affiliate end.
Figure 13:
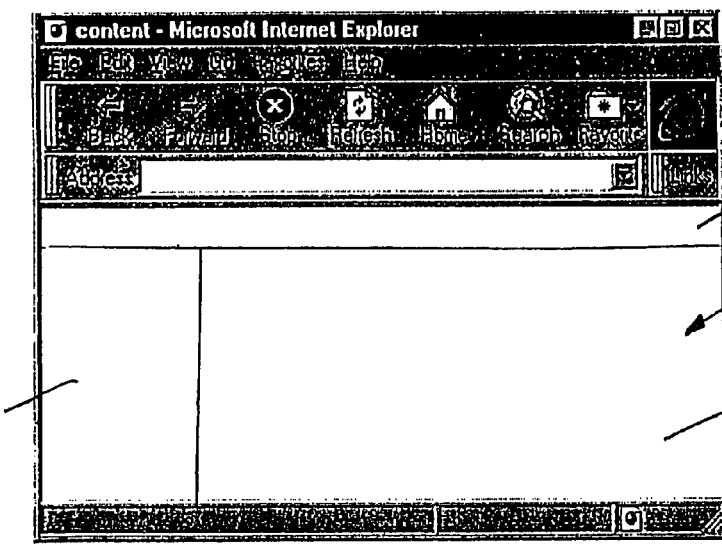
FIG. 13 is a depiction of the Microsoft Explorer browser interface to provide information about content availability and delivery to users of the applicants' system and method.

As shown in FIG. 13, the producer and client interface, e.g., 122 of FIG. 11, occupy the central area 123 of the Microsoft Explorer browser interface on the producer. The central area 123 actually consists of three sub-areas: an HTML helper icon or toolbar sub-area 124, and tree sub-area 126, and a content sub-area 128.

Figure 12:
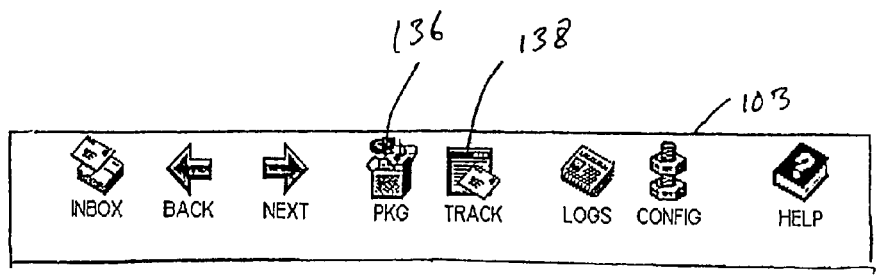
FIG. 12 is a depiction of the toolbar on the producer interface for producers of content for delivery through the applicants' system.

With reference to FIG. 12, the initial applications located in the helper sub-area 124 for the producer interface are:

1. Packager: provides the forms and facilities for creating a package prior to sending it. The following sections are included in the form:

packaging slip with purchase order number, package identification, producer name, subject of the package, and description of its contents;

content listing of file types, ISCI codes, and descriptions;

address listing of the clients or affiliates to whom the package is to be delivered, chosen from a global or private address list (which the producer may create or edit); the address listing may be left empty for later entry;

traffic instructions in the form of an imported fax image or text typed into the form;

delivery options; and an HTML page generator, which is viewed by the client or affiliate upon receipt and opening of the package; can include logos, comments, or any other form of information that can be communicated to the client or affiliate by this HTML generator.

2. Address book manager: provides the capability to view and edit the private address list and submit new addresses to the global list maintained by the delivery server;
3. Tracking: provides the capability to connect to the delivery server and log into and view the web-site on the server as described above; the producer can thus inspect confirmation of delivery information maintained by the server with timestamps based on purchase order numbers and package tracking numbers;
4. Search: a search and report agent that locates folders, packages, or items with a package based on filtering criteria; for example, the producer may procure a listing of packages that were created after a certain date or find an audio file with a particular ISCI code.
5. Log: provides a log of all major transactions performed by the producer; the user may display and print a log filtered according to filters selected by the operator; and the operator may purge or archive the log;
6. Options: provides configuration election tools; for example, the operator may change the dialing properties or account settings for accessing the delivery server; and
7. Audio studio: a utility for playing, editing, recording, or viewing graphical display of, audio files; displays cut description, ISCI code of the cut, and duration of the cut. Preferably, this utility can convert WAV files to MPEG Layer II files by means of a software encoder on the producer.
8. Optional video studio: a utility for playing, editing, or recording video files.

Figure 15:
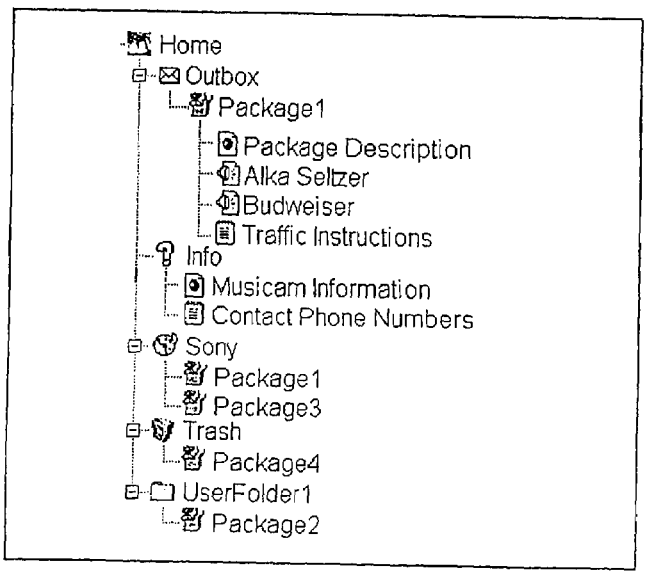
FIG. 15 is folder-tree structure for the tree area of the lay-out of FIG. 14.

Referring now to FIGS. 13 and 15, the tree control area 126 for the producer and client or affiliate user interface contains information generally of the type shown in FIG. 15.

More particularly, this basic tree structure contains:
1. an inbox for any packages on the workstation;
2. "trash" folders to move packages and media the user wishes to delete; and
3. a "saved" folder where the user may reorganize the packages.

The tree control provides the following functionality:
1. all packages are displayed in the producer or client or affiliate folder, and they are sorted;
2. items within a package cannot be deleted;
3. the user can move packages and media within a package from folder to folder by drag and drop;
4. clicking on an audio media file within a package triggers an audio player to play the audio through a sound card, such as Soundblaster card or professional quality Digigram card;
5. if the traffic instruction is a fax image, clicking on it triggers an image viewer to display the fax image;
6. a package can have any type of media within it; and
7. if a package is deleted from the "trash" folder, it is discarded from the workstation system.

The content area 128 shows detailed information about a selected tree branch in HTML form, as noted above. With regard to the example shown in FIG. 15:

1. if "home" is selected or clicked by the operator, the HTML display in the content area 128 show pertinent company information, such as the company logo for the operator of the particular producer workstation; and
2. if a particular package is selected, the displayed HTML shows the detailed description of the package and all of its contents.

Referring now to the affiliate or client user interface shown in FIG. 11, this interface 122 appears when the affiliate or client application software is first booted or loaded by the operator of the affiliate or client workstation. This screen has four areas: toolbar 105, search criteria 130, media list area 132, and audio player area 134. The last three of these areas all appear whenever the operator selects the inbox button on the toolbar 105.

Alternatively, the audio player may be deleted from the user interface of FIG. 11 so that it is launched in its own, separate window or screen. In this fashion, any of a variety of generic audio players may be utilized without customization for insertion into the interface screen of FIG. 11.

Referring again to the producer toolbar shown in FIG. 12, this toolbar 103 includes packager 136 and tracking 138 buttons not present in the client or affiliate toolbar 105 of FIG. 11. The packager button 136 launches that packaging wizard (not shown), and the tracking button 138 causes the delivery status of a package to be displayed in the content area 128 of the producer interface as shown in FIG. 13.

Both the producer interface and the affiliate or client interface have the following features:

1. a new mail indicator provided by an animated inbox icon (content appearing to fall into the inbox); and
2. an error indicator provided by the logs button turning red when repeated attempts to connect to the delivery server 16 have failed.

Referring again to FIG. 11, the search area 130 of the affiliate or client interface allows the operator to type in a search term and display, in the media listing area 132 a listing of all media files containing the search term in their respective titles, identifications of producer or advertiser, or ISCI codes. Through this search area 130, the operator may also choose to display certain types of media files, such as audio spots, new spots, spots that have arrived in the last 24 hours or the last week, or spots that have been sent to the trash bin (which spots can then be recovered if still in the bin).

The search area 130 also contains an advanced button to allow the user to display advanced search options, such as a choice of the types of the content that should be listed. Thus, although the applicant's default button arrangement allows the user to view a list of audio spots only, the advanced buttons allow the user to display traffic instruction or other types of media file listings.

The media listing 132 depends on the options elected in the search area 130. For each item of audio content, e.g., 139, displayed, the list sets forth the title 140, advertiser 142, ISCI code 144, and arrival time 146. These items are displayed by title by default, but the user may sort these columns by clicking on the respective column header, e.g., 140, 142, 144, 146.

To the left of each item of content is an icon reflecting the type of content within the item (e.g., a CD for audio, paper for traffic instructions, etc.). New items not yet opened are in bold, and locked items also appear with a small padlock icon. A locked item is a media file that the affiliate or client user wishes to keep without the client's or affiliate's warehouse manager removing it to make space for new content. The client or affiliate can only lock files amounting to a total of ten percent of the client's or affiliate's entire hard disk space.

As with the tree control explained above for the producer interface, the user can load and play an audio item, for example, by double clicking on it. Right clicking on an item will provide a pop-up menu with options such as opening, locking, or deleting the item, viewing properties for the item (including its title, description, ISCII code, and advertiser), showing the package in which the item arrived, etc.

The digital audio player 134 provides standard MPEG layer II record and playback features. Previous and next buttons may also be added for the audio player 135, and the player may include an additional button 135 to allow trim points to be manually programmed and saved with the audio spot.

Figure 14:
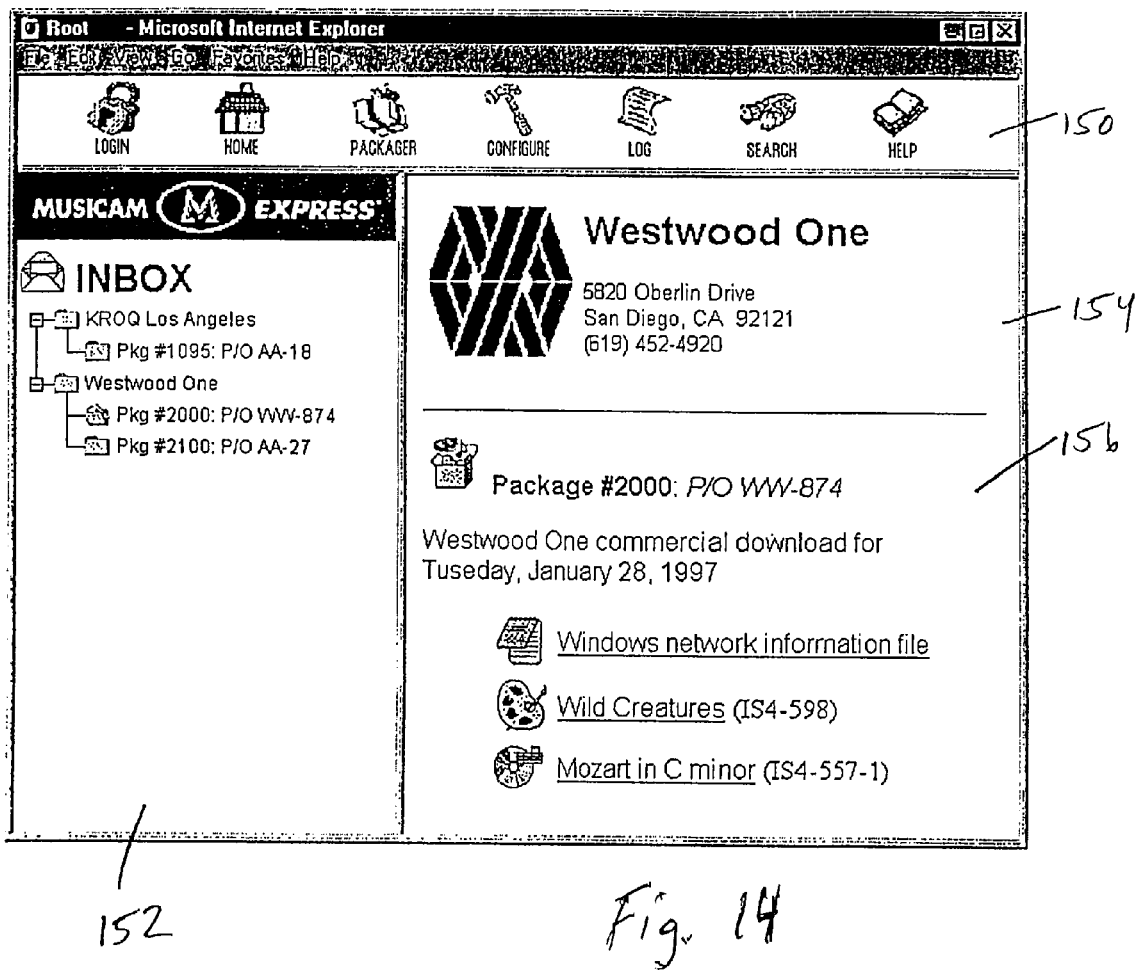
FIG. 14 is a lay-out of the client area of the browser interface of FIG. 13.

Referring now to FIG. 14, the inbox interface for a client or affiliate includes a toolbar area 150, an inbox area 152, a producer logo area 154 (when a particular package is selected), and a package media content area 156. The inbox area 152 thus lists all packages in the inbox for the client or affiliate, and the producer logo area 154 depicts the logo of the producer of the particular package selected in the inbox area 152. The media content area 156 shows the media files with associated icons depicting the nature of the content in the package, and the user may double click on each such media file or icon to view or play the associated file, depending on the nature of its contents.

Figure 16:
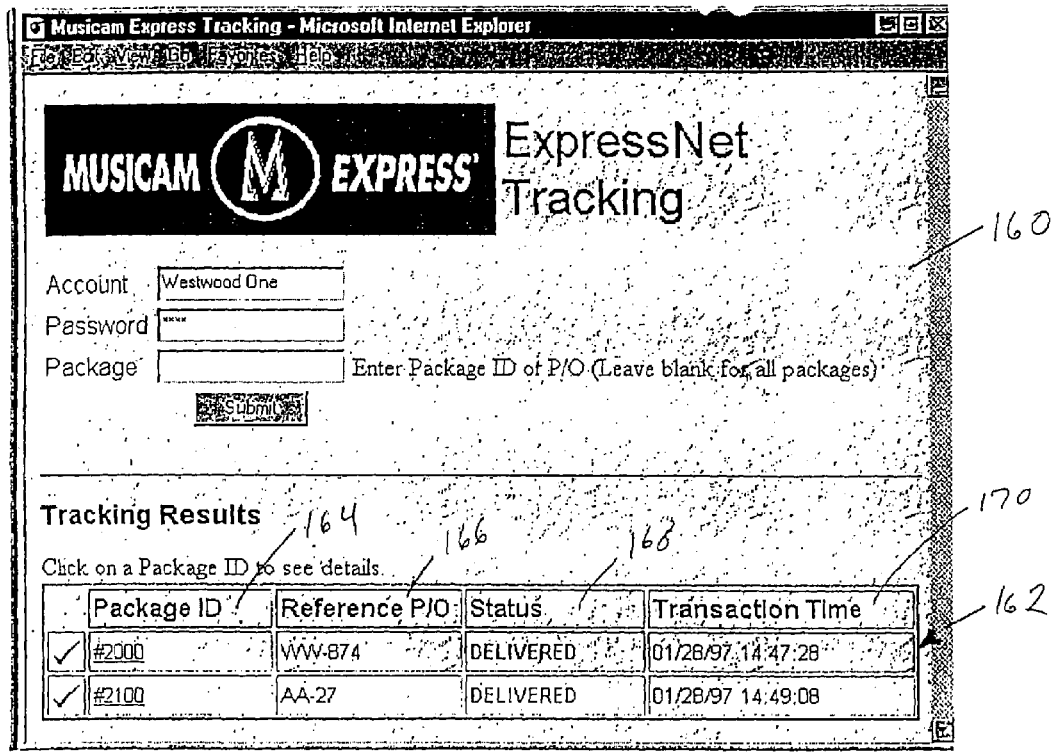
FIG. 16 is a depiction of a sample appearance of the portion of the browser interface of FIG. 13 for a user accessing the delivery tracking features on the delivery server.

Referring now to FIG. 16, the web-site hosted by the media server 16 provides a package tracking interface 160 when a user dials in and logs onto the web-site or otherwise accesses the web-site interface through the Internet. After the user enters its account name and password, the package tracking interface presents a listing 162 of all packages submitted to the web-site by that user. The package tracking interface also provides filtering and sorting options. The listing 162 preferably includes the package identification 164, the user's purchase order number for the package 166, the status of the package (delivered or awaiting delivery) 168, and the transaction time for any completed delivery 170.

Figure 17:
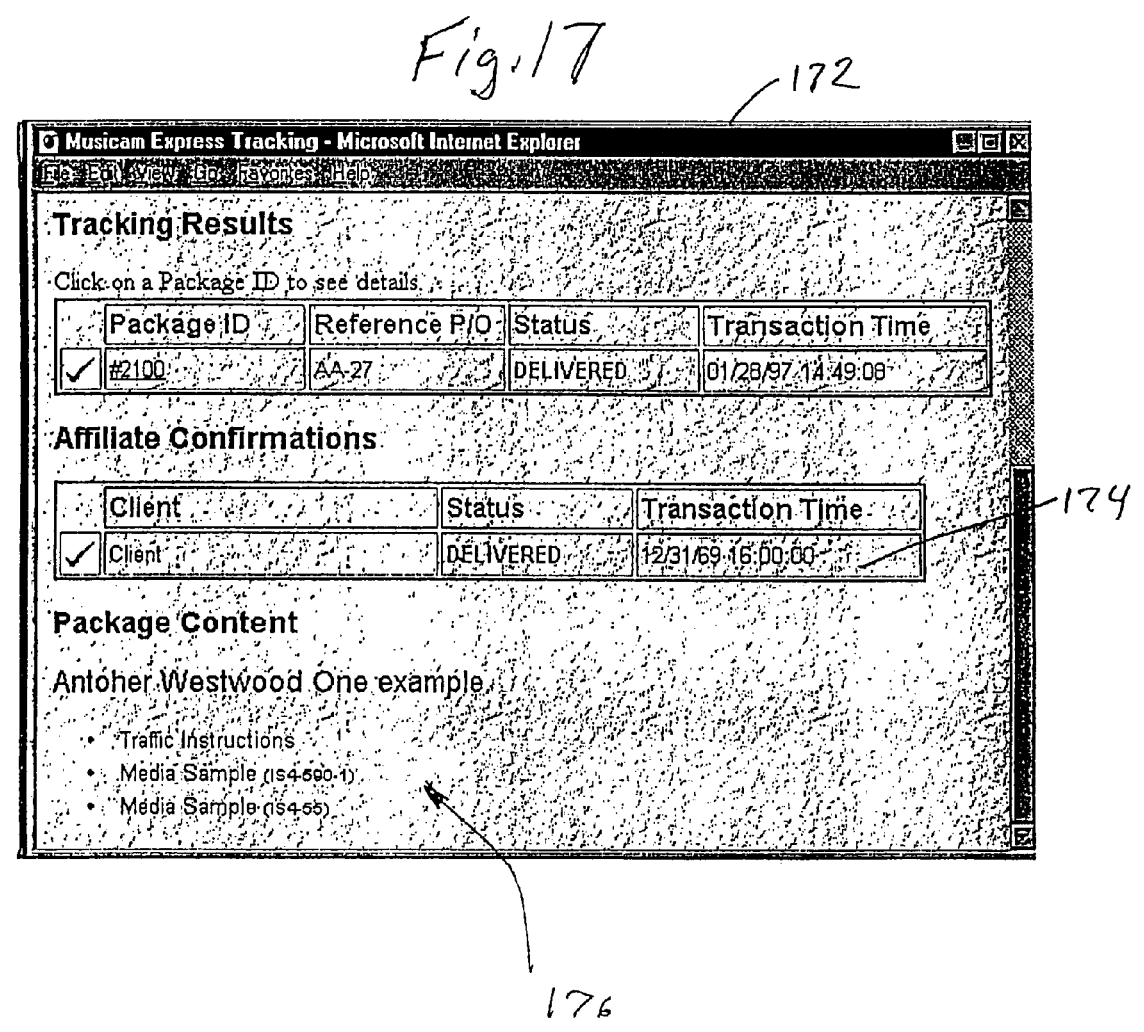

Referring now to FIG. 17, if the user or operator accessing the web-site on the server 16 then clicks on a given package identification in the listing 162 on the package tracking interface 160 as shown in FIG. 16, the package detail report interface 172 appears for the particular package selected by the operator or user. This report 172 provides additional information about the status of a given package, such as affiliate confirmation details 174 the contents of the package 176.

Envelopes and Confirmations:

With reference again to FIGS. 1-6, envelopes generated within the applicants' preferred system 10 are named: ENV.pkgid.TXT, where "pkgid" is a package identification that uniquely identifies a package across all producers. Pkgid is a long decimal value generated by the producer's package Wizard. The high-word of the package identifier is the unique producer identification. The low-word is a persistent incrementing counter (wraps after 32K packages).

The file format for envelopes is as follow:
ENVELOPE
ID: #pkgid
DATE: yy/mm/dd hh:mm:ss
ACCT: "account"
AD: "advertiser"
PO: "workorder"
SUBJ: "title"
DESC: "description"
FOLDER: "folder"

PRIO: [BEST/LOCALX/EXPRESS2/EXPRESS4/LOCAL/OVERNIGHT/TWODAY]
LIFE: showtime, killdate
FILE: "filename", "title", "description", "iscii", "advertiser", filesize "yy/mm/dd hh:mm:ss"
ADDR: "account" [,"fullname", "address", "phone"]
Note:
The ENVELOPE tag must appear first in the envelope. All other tags may appear in any sequence.
All tags are separated by CR and/or LF (ascii 13 or 10). All tags are separated from data fields by a colon and a space pair. All data parameters are comma separated. Any data parameter that includes commas or spaces will be enclosed in quotes.
Required tags appear in bold. When not supplied, the default value (an empty string) is assumed.
pkgid is package ID that uniquely identifies a package across all producers. It's a long decimal value generated by the producer's packager Wizard. The high-word of the package ID is the unique producer dax ID.
The low-word is a persistent incrementing counter (wraps after 32K packages).
account is the short login account name, e.g., KROQ.
showtime and killdate are timestamps derived from the C library call time() representing the number of seconds elapsed since Jan. 1, 1970. A showtime values of 0 indicates package is displayed immediately upon arrival. A killdate of 0 indicates package does not automatically expire.
One FILE tag should exist for each file. The filesize field is in bytes. The file timestamp is the last modification date/time of the file. The filename is a long filename augmented as follows:
media.TTTTTTTT-SSS.title.ext
home.pkgid.html
logo.daxid.title.ext
where ext is the file type (audio files will be .S48, logo images will be .BMP or .GIF, etc.)
where title.ext is the full filename as created or imported on the producer (pre-augmented)
where TTTTTTTT is the 8-character hexidecimal modification timestamp of the file
where SSS is the hexidecimal filesize in bytes
where daxid is the unique producer dax ID.
where pkgid is the unique package ID (in decimal) to which the HTML applies.
One ADDR tag should exist for each recipient of the package. The account value represents the unique globally addressible account. If the recipient is from the private address book, full mailing information is provided with additional parameters.
Special characters: CR/LF characters embedded within quoted data values are replaced with pipe character:|
Envelope encoding: for the reasons of security and integrity, envelopes may be encoded with a proprietary encoding scheme specified later.
The specification for confirmations send within the system 10 are named as follows:
CONFIRM.pkgid-account.TXT
Note:
pkgid is package ID that uniquely identifies a package across all producers. It is a long decimal value generated by the producer's packager Wizard. The high-word of the package ID is the unique producer dax ID. The low-word is a persistent incrementing counter (wraps after 32K packages).
account is the short login account name of the confirming affiliate (not the producer of the package), e.g. KROQ.
The file format for confirmations is as follows:
CONFIRMATION
ID: #pkgid
ACCT: "account"
DATE: yy/mm/dd hh:mm:ss
Note:
The above message is e-mailed by recipients (clients or affiliates) back to the delivery server mailman after the package has been completely fetched. The tags are described in the envelope specification.
The date represents the local date/time the affiliate or client completed picking up the package.
The account is that of the confirming affiliate or client (not the producer of the package).
A package addressed to N online affiliates or clients causes N confirmation messages to be returned and processed by the mailman.

BFTP:
The purpose of Broadcast File Transfer Protocol (BFTP) is to reliably transmit binary files over a one-way broadcast satellite network from an uplink server to one or more downlink clients. The BFTP protocol includes a means of group addressing such that the file will be received and stored only by those target sites (affiliates) included in an address list.
In order to address target sites, each site is provided a unique numeric identification. This identification is a 32-bit numeric value in the range 1-4,294,967,295 (providing over 4 million unique identifiers). 0 is reserved as a broadcast identification. Each affiliate identification is stored (in encoded format) in the affiliate registry and may be programmed through an affiliate configuration form. This affiliate identification is independent and unrelated to the satellite receiver's permissioning identification.
With reference to FIG. 2, the BFTP data flows through a satellite system as follows:
1) The BFTP server 36 scans for packages 34 and prioritizes the files referenced therein for transmission.
2) The BFTP server 36 breaks files down into headers and records that are sent out via an Ethernet card (via UDP packets) in the BFTP server 36 onto the LAN router 40 administering the LAN connection between the BFTP server 36 and TCP/IP router 40. Headers describe the file being sent and list the target addresses. Records contain the file data.
3) The router 40 outputs a synchronous stream into a service port on the StarGuide® MX3 Multiplexer 44.
4) The Multiplexer 44 aggregates this data stream with other services that are fed into the uplink system and transmitted to the various StarGuide® II Receivers, e.g., 52.
5) A StarGuide® Ethernet Card (not shown) is mounted in each Receiver 52 for each satellite affiliate 20. This StarGuide® Ethernet Card faithfully sends the TCP/IP packets that entered into the uplink's router 40, onto a LAN 54 fed by the StarGuide® Ethernet Card in the StarGuide® II Receiver 52. The StarGuide® Ethernet Card connects to the LAN 54 through a built-in 10-base-T (RJ45) connector.
6) The BFTP affiliate agent (not shown) running on the affiliate workstation filters the headers and records and saves to the file system 58 all files targeted to the affiliate 20.

The BFTP protocol operates as follows:

The BFTP protocol breaks a file down into BFT Headers and BFTP Records. The headers describe the file and list the target addresses. The records contain the file data. Each of these records is defined as set forth below in C++ programming language:

```
//WWW.XXX.YYY.ZZZ
#define MAX 128            //max file name length
Typedef byte IPADDR[4];    //TCP/IP address
//File transfer info (note: count ID entries should follow)
Typedef struct {
    word version;          //BFTP_INFO structure version (initially 0)
    char filename[MAX];    //ASCIIZ filename transferred (path not included)
    dword timestamp;       //modified timestamp (GMT)
    dword filesize;        //total size of file (bytes)
    word framesize;            //size of each data portion of the BFTP record (bytes)
    word crc64;            //32-bit file CRC
    dword transID;             //identifying transaction
    IPADDR sendaddr;       //identifying target group (IGMP group address)
    word count;            //count of target addresses (0 if broadcast)
} BFTP_INFO;
//File transfer info (note len data follows)
typedef struct {
    dword transID;            //identifying transaction
    dword fpos;               //offset into file
    word len;                 //data length (should be fixed framesize field in
                              BFTP_INFO)
} BFTP_DATA;
//special commands (T.B.D.)
typedef struct {
    word cmd;    //command identifier
    dword param;          //data associated with the command
    word len;        //datalength (when parameters follow this structure. Usually 0)
} BFTP_COMMAND;
```

The BFTP_INFO structure describes the target filename and its attributes through the first three fields. Through the sendaddr field, the server is informed of the affiliates to whom the file will be transmitted. The transID field uniquely identifies a file transmission. The count field identifies how many 32-bit affiliate identifications follow the BFTP_INFO structure. Each affiliate identification uniquely identifies a receiving unit, and is stored after the header as a DWORD.

The BFTP_DATA structure contains the file data. The record's transID field identifies the file transaction to which this record applies. This field is used to match BFTP_DATA's with BFTP_INFO's. The data itself follows the BFTP_DATA.

UDP packet sizes are limited in most systems to 1500 bytes. For the most part, BFTP_INFO records sets the framesize field to 1024 (bytes per BFTP_DATA data). Likewise, exactly 1024 bytes of data are appended to all but the last BFTP_DATA. The last record's len field and data are truncated down to as many bytes as necessary to complete the file.

The UDP packet is limited to 1500 bytes. The BFTP_INFO header's structure requires 146 bytes, leaving 1354 bytes for the address list. Since each address list requires 4 bytes, a BFTP_INFO supports up to 338 addresses. If a file is to be delivered to more than 338 clients, then the addresses may be spread over multiple BFTP_INFO records. As an example, if a file is to be delivered to 2000 target addresses, then those addresses may be sent using 6 BFTP_INFO records containing identical file and transaction information.

The BFTP server utilizes IGMP group addressing to send records and headers to groups of affiliates. IGMP (Internet Group Multicast Protocol) is an extension to the TCP/IP protocol suite and is similar to UDP. Before the standardization of IGMP, the TCP/IP protocol supported broadcast and targeted packet addressing. That is, packets can be sent to every target address, or to only one target address at a time. Using IGMP, target clients may "join" a logical group IP address. When the server 16 sends a packet to this group address, all clients that joined the group receive the packet. All other clients ignore the packet. Clients "drop" from the IGMP group whenever a transaction is closed (aborted or successful). From transmission to transmission, only the transaction identification remains constant, not the IGMP group.

The server assigns a new IGMP group address per file transaction. IGMP address ranges are from 224.0.0.0 to 239.255.255.255. This range allows for 248,720,625 group addresses. However, unlike internet TCP/IP addresses, IGMP group addresses are not licensed, reserved addresses. To avoid the probability of an address conflict, exactly one IGMP address, 230.10.10.0, is reserved as the "broadcast" channel to which all affiliates listen. The BFTP_INFO packets are thus sent over this channel. The sendaddr field of this record, which identifies the group address to which the associated BFTP_DATA packets are sent, range from 239.255.0.0 to 239.255.0.255. Thus, transactions reuse the 255 group addresses. Both the reserved control IGMP address (239.255.0.0) and the file-transaction IGMP address range (239.255.0.0-239.255.0.255) are reprogrammed through the registry. TCP/IP transmission port, also programmable, is 4000.

After the BFTP server selects a file to transmit, it composes an address list from all of the envelopes that reference the file. It generates a BFTP_INFO packet specifying the file and listing the target addresses. This packet is output from the server 16 as a UDP packet, which is faithfully broadcasted by the satellite system to the affiliate network. This packet is sent to the control IGMP address. After every BFTP_INFO transmission, the server 16 idles for a configurable period (e.g., 4 seconds) to allow the BFTP affiliates to process or discard the header.

Every BFTP client then "joins," or becomes a member of, the control IGMP address group. Thus, all BFTP affiliates "listen" for BFTP_INFO packets. On receiving a BFTP_INFO packet, the affiliate scans the address list for its own identification. If the affiliate finds its identification, then it begins its new transaction by creating the empty file in its default directory. The affiliate also joins the IGMP address group specified in the BFTP_INFO's sendaddr field. On joining the group, the affiliate listens for the BFTP_DATA records associated with the BFTP_INFO.

The BFTP affiliate processes multiple file transactions at a time simply by listening to multiple IGMP addresses. The TCP/IP protocol stack blocks all UDP packets sent to IGMP address groups that the affiliate has not joined. However, the affiliate receives all BFTP_INFO and BFTP_DATA packets it listens to over the same TCP/IP socket. Therefore, as each BFTP_DATA is received, the affiliate matches it with a BFTP_INFO transaction. The BFTP_DATA is usually received in order and the transaction matches the last received BFTP_INFO record. Dropped packets and packet retransmission is commonplace in satellite transmission, however. Thus, the affiliate's BFTP_DATA processing algorithm is optimized for the common case (proper reception) and accounts for the latter (dropout).

The affiliate can process up to 32 files at a time. For each transaction in progress, the affiliate maintains an opened file and a "file Bitmask" to record which records have been received. Each bit of the bitmask represents one data record of 1024 bytes (as related in framesize field). The size of this bitmask varies with each file transaction and has a filesize of 1024 bytes. For example, to receive a 1-megabyte file, the affiliate processes a bitmask of 128 bytes. Since the overhead to maintain the bitmask is only 0.01% of the file size, this bitmask may be kept in memory, or for exceptionally large files (over one gigabyte), the bitmask which can exceed 128 kbytes may be cached into a temporary file.

For each BFTP_DATA packet received, the affiliate marks the record's representative bit in the bitmask. When all of the data records have been received, the affiliate completes the transaction and saves the file into the affiliate's file system 58. Any gaps in the bitmask represent a dropped packet, which can be received on the next transmission.

On the BFTP server's next transmission of the same file, the affiliate ignores the BFTP_DATA records it has already received. Once all missing BFTP_DATA records are received, the affiliate drops out of the IGMP session, closes the file as complete, performs a final 32-bit CRC, and matches the value to the precalculated CRC provided in the header. If the CRC does not match, the affiliate discards the file, since at this point, the affiliate cannot determine which record was corrupted. When the affiliate detects a packet out of sequence or a "gap," it writes zero-data into the file to fill in the gaps. When the missing packets arrive, the affiliate writes the correct information into those gaps. When the affiliate receives a BFTP_INFO structure, the affiliate:

A) scans for its identification to determine if it should receive the file, and if so:
B) checks to see if it is already processing the file transaction. If so it will ignore the transaction. If not, the affiliate:
C) scans the directory to see if it has received the file already (compared by filename, filesize, and timestamp). If so, again it will ignore the transaction. If not, then the affiliate:
D) creates and opens the file with the specified name, determines how many BFTP_DATA records it will receive, and allocates and initializes a file bitmask.

The time it takes the affiliate to scan the header's address list, scan its own transactions, abort outstanding transactions, and create the file is the reason the server will pause for a few seconds after each BFTP_INFO header is transmitted.

The following conditions should be taken into consideration for the receive algorithm.

Errors in transmission of the BFTP_INFO and BFTP_DATA records are filtered out by the TCP/IP protocol, so received records will not be corrupted. However, the affiliate should drop packets with unexpected version identifiers or when the received packet length does not exactly match the expected packet length.

If the BFTP client receives a BFTP_INFO record in which the transaction identification matches a currently opened transaction but the filename does not match the filename in progress, then the old file is deleted and the transaction aborted. The new BFTP_INFO record is processed as usual.

If a BFTP_DATA record is received and the transaction is not opened, the BFTP_DATA record is ignored.

Transactions that are opened for more than 24 hours are aborted and the associated files deleted.

If the BFTP_INFO record specifies a file that exists but the file size does not match, then the existing file is deleted and overwritten with the new file.

Transactions are kept open by the affiliate because it could not receive the entire file the first time. If the affiliate begins a new transaction but it has reached its limit of 32 for open transactions, the affiliate aborts, and deletes the associate file of, the oldest transaction. The BFTP server sends files in their entirety. The BFTP server simultaneously transmits two files at a time when long form programs are put on hold for short spot delivery.

An IGMP address can be shared between transactions. It is the transaction identification that uniquely identifies a transaction. If the affiliate receives two BFTP_INFO records with the same IGMP address, both transactions continue undisturbed.

If the affiliate is rebooted, all transactions in progress are aborted. Each file is saved into a temporary name until it is received in its entirety, when it is renamed to its final usable name. If the machine is rebooted, then when the affiliate resumes, it automatically deletes all of the temporary files because they represent transactions that cannot be resumed.

The BFTP server frequently retransmits files and file header information. The BFTP server transmits a file twice in its entirety before lowering its retransmission priority. Furthermore, for every 100 BFTP_DATA records transmitted, the server transmits the transaction's BFTP_INFO record. This adds under 2% overhead to the file transmission for files over 100 kbytes. However, this allows BFTP affiliates that missed the initial BFTP_INFO record due to satellite downlink errors to join the transaction midway through the process. Thus, on the second transmission of the file, there is a greater likelihood that much of the file will already have been received.

The standard 32-bit CRC calculated on each file uses the following CCITT polynomial (represented in hexadecimal as 0xEDB88320):

$$X^{32}+X^{26}+X^{23}+X^{22}+X^{16}+X^{12}+X^{11}+X^{10}+X^{8}+X^{7}+X^{5}+X^{4}+X^{2}+X^{1}+X^{0}$$

The delivery server's mailman agent submits files (and address lists) to the BFTP server for transmission. Submitted files are prioritized (or sorted) by four criteria: transmit count, due date, submit date, then filesize. When a file is first submitted, its transmit count will be 0, and so it will have highest priority. If 10 files are queued for first-time delivery, then the file that is to be delivered sooner will be transmitted first. If those files all have the same due-date, then the file submitted first is sent first. As a result, packages of files submitted at the same time with the same due-date tend to be delivered together to complete a package.

Once a file is transmitted, its transmit count is incremented, so freshly submitted files will have higher priority. However, if no new files are queued for transmission, the file with the lowest retransmission count will be sent next. A file remains queued by the BFTP server until one-day past its due date.

It is to be understood that the foregoing is a detailed description of the applicants' preferred embodiment. The scope of the applicants' invention, however, is to be determined by reference to the following claims.

What we claim is:

1. A distribution system for digital media, said distribution system including:
    a one-way, high-bandwidth communication channel separate from the Internet;
    a media server system in communication with the Internet and with said communication channel, said media server system adapted to transmit digital media;
    an affiliate computer system located remotely from said media server system, said affiliate computer system in communication with said media server system through the Internet; and
    a broadcast receiver in communication with said affiliate computer system, wherein said broadcast receiver is adapted to receive a broadcast communication of said media from said media server system through said communication channel,
    wherein said affiliate computer system is configured to request the transmission of said media through the Internet in response to a triggering communication from said media server system,
    wherein said media server system includes an affiliate computer system address book maintenance application and said media server system is adapted to transfer at least a portion of an affiliate address book to said affiliate computer system.

2. The system of claim 1 wherein said media is enclosed in a package including an envelope portion having addressing information.

3. The system of claim 1 wherein said communication channel includes satellite communication.

4. The system of claim 2 wherein said communication channel includes satellite communication.

5. The system of claim 1 wherein said broadcast receiver is configured to provide media received using said broadcast communication to said affiliate computer system in Ethernet-compatible format.

6. The system of claim 2 wherein said broadcast receiver is configured to provide media received using said broadcast communication to said affiliate computer system in Ethernet-compatible format.

7. The system of claim 3 wherein said broadcast receiver is configured to provide media received using said broadcast communication to said affiliate computer system in Ethernet-compatible format.

8. The system of claim 1 wherein said broadcast receiver is configured to provide media received using said broadcast communication to said affiliate computer system in IGMP-compatible format.

9. The system of claim 2 wherein said broadcast receiver is configured to provide media received using said broadcast communication to said affiliate computer system in IGMP-compatible format.

10. The system of claim 3 wherein said broadcast receiver is configured to provide media received using said broadcast communication to said affiliate computer system in IGMP-compatible format.

11. The system of claim 1 wherein said media server system is configured to track the delivery of digital media to said broadcast receiver.

12. The system of claim 1 wherein said media server system is configured to track the delivery of digital media to said affiliate computer system.

13. The system of claim 11 wherein said media server system is configured to provide the status of said delivery of digital media to a remote computer system.

14. The system of claim 12 wherein said media server system is configured to provide the status of said delivery of digital media to a remote computer system.

15. The system of claim 1 further including a plurality of affiliate computer systems and associated broadcast receivers.

* * * * *